(12) United States Patent
Nishizawa

(10) Patent No.: US 7,653,301 B2
(45) Date of Patent: Jan. 26, 2010

(54) ELECTRONIC DEVICE AND CAMERA

(75) Inventor: Akio Nishizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 845 days.

(21) Appl. No.: 10/866,729

(22) Filed: Jun. 15, 2004

(65) Prior Publication Data

US 2004/0258976 A1 Dec. 23, 2004

(30) Foreign Application Priority Data

Jun. 23, 2003 (JP) .............................. 2003-177796

(51) Int. Cl.
G03B 7/26 (2006.01)
G03B 17/02 (2006.01)
H04N 5/225 (2006.01)
H01M 2/00 (2006.01)
H01M 8/00 (2006.01)

(52) U.S. Cl. ...................... 396/277; 396/301; 396/539; 348/372; 348/373; 429/12; 429/34

(58) Field of Classification Search ................. 396/301, 396/539, 277; 429/19, 20, 34, 38, 39; 348/364, 348/372, 373, E5.05; 399/98
See application file for complete search history.

(56) References Cited

U.S. PATENT DOCUMENTS

| | | | |
|---|---|---|---|
| 5,233,379 A | | 8/1993 | Burnham .................... 396/349 |
| 6,057,051 A | * | 5/2000 | Uchida et al. ................. 429/34 |
| 6,447,945 B1 | * | 9/2002 | Streckert et al. ............... 429/34 |
| 6,714,248 B1 | * | 3/2004 | Inoue ......................... 348/372 |

(Continued)

FOREIGN PATENT DOCUMENTS

JP          A-6-18971          1/1994

(Continued)

OTHER PUBLICATIONS

English translation of Decision to Dismiss Amendment for Japanese Patent Application No. 2003-177796, Dec. 9, 2008, pp. 12-15, Japan.

(Continued)

*Primary Examiner*—Melissa J Koval
(74) *Attorney, Agent, or Firm*—Oliff & Berridge, PLC

(57) ABSTRACT

The object of the present invention is to enable reliable supply of oxygen which is necessary for a fuel cell to generate electric power, to the fuel cell.

In a camera, air orifices for linking the space inside a cell compartment with the outside of a casing are disposed in a position other than the portion (grip portion) which is held by a user, in the vicinity of the center of the front surface of the casing, that is, in the vicinity of a lens-barrel, and a concave-convex portion serving as an air orifice guard is formed at the side opposite to that where the lens-barrel is disposed with respect to the air orifices. As a result, even when the user takes a picture of an object by holding the camera with his/her own hand, the air orifices are prevented from being closed by the user's hand, oxygen (air) can be constantly supplied to the fuel cell accommodated inside the cell compartment, and the fuel cell can continuously generate a sufficient quantity of electricity. The present invention can be employed in a camera.

2 Claims, 17 Drawing Sheets

U.S. PATENT DOCUMENTS

| | | | |
|---|---|---|---|
| 6,912,006 B2* | 6/2005 | Shimizu | 348/364 |
| 7,442,451 B2* | 10/2008 | Sugihara | 429/12 |
| 2005/0008918 A1* | 1/2005 | Nakakubo et al. | 429/34 |
| 2005/0012851 A1* | 1/2005 | Nishizawa et al. | 348/372 |
| 2005/0019639 A1* | 1/2005 | Nakakubo et al. | 429/34 |
| 2005/0227136 A1* | 10/2005 | Kikuchi et al. | 429/34 |
| 2006/0182435 A1* | 8/2006 | Sugihara | 396/277 |
| 2008/0117327 A1* | 5/2008 | Nishizawa et al. | 348/372 |
| 2009/0086087 A1* | 4/2009 | Kikuchi et al. | 348/372 |

FOREIGN PATENT DOCUMENTS

| | | |
|---|---|---|
| JP | A-8-64190 | 3/1996 |
| JP | A-9-211636 | 8/1997 |
| JP | A-11-190881 | 7/1999 |
| JP | A-2003-186087 | 7/2003 |
| JP | 2003-295284 * | 10/2003 |
| JP | A-2004-77879 | 3/2004 |
| WO | WO 03/049223 A1 | 6/2003 |

OTHER PUBLICATIONS

English translation of Notification of Reason for Refusal for Japanese Patent Application No. 2003-177796, Aug. 19, 2008, pp. 9-11, Japan.
English translation of Notification of Reason for Refusal for Japanese Patent Application No. 2003-177796, Apr. 25, 2008, pp. 1-8, Japan.
English translation of Decision of Refusal for Japanese Patent Application No. 2003-177796, Dec. 9, 2008, pp. 16-17, Japan.

* cited by examiner

ELECTRONIC DEVICE AND CAMERA

BACKGROUND OF THE INVENTION

1. Field of the Invention

The present invention relates to an electronic device and a camera, and more particularly to an electronic device and a camera in which, when a fuel cell is used as a power source for the electronic device and camera, oxygen necessary for the fuel cell to generate electric power can be reliably supplied to the fuel cell.

2. Description of the Related Art

Following recent miniaturization and improved functionality of electronic devices such as cellular phones and cameras, the batteries serving as power sources for the electronic devices are also required to be further miniaturized and to have improved functionality.

Small fuel cells that have an energy density higher than that of the batteries that have been conventionally used, such as lithium ion batteries, have recently attracted much attention, and commercialization of electronic devices using fuel cells as a power source has been researched and developed.

Thus, electronic devices using fuel cells as a power source are still at the stage of research and development. Therefore, there are no adequate references relating to prior art.

A sufficient amount of oxygen is necessary for the fuel cells to generate electric power and, therefore, the supply of oxygen present in the air to the fuel cells has been considered. In this case, it is necessary to provide for sufficient contact of a fuel cell accommodated inside a casing with the air present outside the casing.

However, when a user employs a small electronic device, for example, a camera, the user either holds the casing with a hand or holds it by connecting to a tripod or the like. Thus, small electronic devices are held differently in a variety of places, rather than being constantly fixed to a prescribed place (the prescribed device is held in the prescribed place), as large television receivers.

Furthermore, users sometimes connect auxiliary units that add new or improve existing functions and use such electronic devices. For example, usage of an auxiliary unit carrying a fuel cell, which functions as a battery, as an auxiliary unit for a camera has been considered.

Therefore, in order to commercialize the electronic devices using a fuel cell as a power source, it is necessary to take measures providing for sufficient contact of the air with the fuel cell accommodated inside the casing of the electronic device, regardless of the way the casing is held and without regard to the type of the auxiliary unit connected to the electronic device.

However, the problem was that the effective measures of this kind have yet to be developed.

With the foregoing in view, it is an object of the present invention to enable a reliable supply of oxygen, which is necessary for a fuel cell to generate electric power, to the fuel cell, when the fuel cell is used as a power source for an electronic device or camera.

SUMMARY OF THE INVENTION

The first electronic device in accordance with the present invention comprises a cell compartment for accommodating a fuel cell, and an opening for linking the space inside the cell compartment with the outside of a casing of the first electronic device, which is disposed in a position in the vicinity of the center of the prescribed surface of the casing, this position being other than the portion which is held by a user.

The first electronic device can be a camera comprising detachably or integrally a taking lens-barrel at the side of the surface of the casing where the opening is disposed, wherein the opening is disposed in the vicinity of the taking lens-barrel.

A protrusion or a recess can be formed at the surface of the casing where the opening is disposed, at the side opposite to that where the taking lens-barrel is disposed with respect to the opening, in the vicinity of the opening.

In the first electronic device in accordance with the present invention, an opening for linking the space inside the cell compartment for accommodating a fuel cell with the outside of the casing is disposed in a position in the vicinity of the center of the prescribed surface of the casing, this position being other than the portion which is held by the user.

The second electronic device in accordance with the present invention comprises a cell compartment for accommodating a fuel cell, a connection portion for connecting to another device, and an opening for linking the space inside the cell compartment with the outside of a casing of the second electronic device, this opening being disposed at a certain surface in the vicinity of the connection portion, of the surfaces of the casing, wherein the surface where the opening is disposed faces the other device and is not in contact therewith when the other device is connected to the connection portion.

The surface where the opening is disposed can be at a prescribed distance from the other device when the connection portion is connected to the other device.

The second electronic device can be a camera employing a fuel cell as a power source, and the other device can be an auxiliary device for the camera, which provides the camera with a prescribed function.

Alternatively, the other device can be a camera, and the second electronic device can be an auxiliary device for the camera, which provides the camera with a prescribed function. In this case, the second electronic device can be further provided with a power supply means for supplying electric power from the fuel cell accommodated in the cell compartment to the camera.

In the second electronic device in accordance with the present invention, the opening for linking the space inside the cell compartment for accommodating a fuel cell with the outside of the casing is disposed at a surface which faces the other device but is not in contact therewith when the other device is connected to the connection portion, which is a certain surface in the vicinity of the connection portion, of the surfaces of the casing thereof.

The third electronic device in accordance with the present invention comprises a connection portion for connecting another device comprising a cell compartment for accommodating a fuel cell and an opening for linking the space inside the cell compartment with the outside of a casing of the other device, and a protrusion which protrudes from the surface facing the opening and is disposed in the vicinity of the surface facing the opening when the other device is connected to the connection portion, of the surfaces of a casing of the third electronic device, wherein the connection portion is disposed at the protrusion.

The third electronic device can be a camera, and the other device can be an auxiliary device for the camera, which provides the camera with a prescribed function.

In the third electronic device in accordance with the present invention, the connection portion for connecting another device comprising a cell compartment for accommodating a fuel cell and an opening for linking the space inside the cell compartment with the outside of the casing of the other device is disposed at the protrusion which protrudes from the surface facing the opening and is disposed in the vicinity of the surface facing the opening when the other device is connected to the connection portion, of the surfaces of the casing of the third electronic device.

The fourth electronic device in accordance with the present invention comprises a first cell compartment for accommodating a first fuel cell, a first opening for linking the space inside the first cell compartment with the outside of a casing of the fourth electronic device, a connection portion for connecting another device comprising a second cell compartment for accommodating a second fuel cell and a second opening for linking the space inside the second cell compartment with the outside of a casing of the other device, wherein the first opening is disposed in a position which is not in contact with the other device and which faces the second opening when the other device is connected to the connection portion.

The fourth electronic device can be a camera, and the other device can be an auxiliary device for the camera, which provides the camera with a prescribed function.

In the fourth electronic device in accordance with the present invention, there are provided a first cell compartment for accommodating a first fuel cell, a first opening for linking the space inside the first cell compartment with the outside of the casing of the fourth electronic device, a connection portion for connecting another device comprising a second cell compartment for accommodating a second fuel cell and a second opening for linking the space inside the second cell compartment with the outside of the casing of the other device, wherein the first opening is disposed in a position which is not in contact with the other device when the other device is connected to the connection portion and which faces the second opening.

The camera in accordance with the present invention comprises a cell compartment capable of accommodating a fuel cell and a taking lens-barrel detachably or integrally, wherein an opening allowing contact of the fuel cell located inside the cell compartment with the outside-air is provided between the cell compartment and the taking lens-barrel.

In the camera in accordance with the present invention, an opening allowing contact of the fuel cell located inside the cell compartment with the outside air is provided between the cell compartment capable of accommodating a fuel cell and the taking lens-barrel.

DESCRIPTION OF THE PREFERRED EMBODIMENTS

First Embodiment

Figure 1:
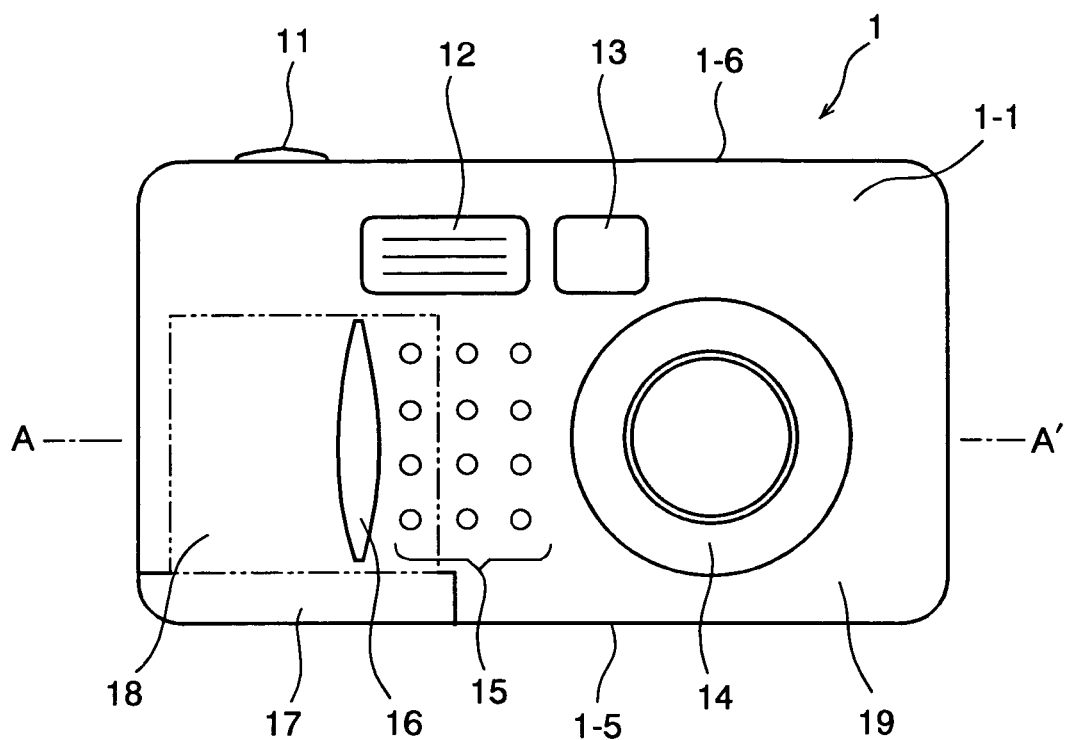
FIG. 1 is a front view illustrating an example of the external configuration of the camera employing the present invention.
Figure 2:
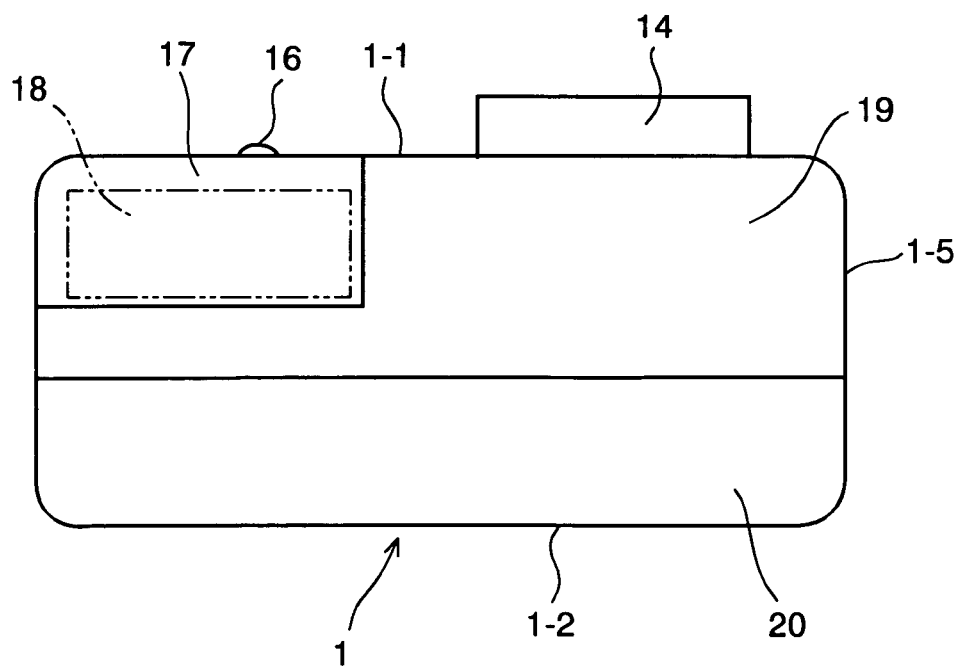
FIG. 2 is a bottom view illustrating an example of the external configuration of the camera shown in FIG. 1.

FIG. 1 illustrates an example of the external configuration of the front surface of a camera as an electronic device employing the first embodiment of the present invention. FIG. 2 represents an example of the external configuration of the lower surface of the camera 1 shown in FIG. 1.

As shown in FIG. 1, a release button 11 which is pushed when a user takes a picture of an object is provided on a side surface 1-6 of the casing of the camera 1.

The surface 1-6 where the release button 11 is disposed will be hereinbelow called an upper surface and a surface 1-5 which is opposite to the upper surface 1-6 will be called a bottom surface, those surfaces being side surfaces which are substantially perpendicular to a main surface 1-1 of the casing of the camera 1. Here in FIG. 1, for example, among the normal directions to the bottom surface 1-5 of the casing of the camera 1, the direction from the bottom surface 1-5 to the upper surface 1-6 will be considered as an upward direction. Such a relationship between the upper surface, bottom surface, and upward direction is the same for other drawings (the below-described other embodiments), unless stated otherwise.

A light-emitting unit 12 for emitting light as a flash when the user takes a picture of the object and a finder 13 allowing the user to view the object are provided from left to right at the front surface 1-1 of the casing of the camera 1, above almost the center thereof. A lens-barrel 14 having taking lenses for taking a picture of the object, air orifices 15 for linking the space inside a cell compartment 18 for accommodating a fuel cell (for example, the below-described fuel cell 31 shown in FIG. 5) with the outside of the casing of the camera 1, and an air orifice guard 16 are provided from right to left below the aforementioned components, and a lid 17 which is opened when the user pulls out the fuel cell accommodated in the cell compartment 18 and closed otherwise is provided therebelow.

The air orifices 15 are provided for introducing oxygen (air) used by the fuel cell accommodated in the cell compartment 18 for generating electric power from the outside of the casing of the camera 1 into the space (fuel cell) inside the cell compartment 18.

Therefore, when the user holds the camera 1 with his/her hand and takes a picture of the object, the air orifices 15 should not be closed by the user's hand. Accordingly, in the camera 1, as shown in FIG. 1, the air orifices 15 are disposed close to the lens-barrel 14 almost in the center of the front surface 1-1 of the casing.

Thus, when the user holds the camera 1 with his/her hand and takes a picture of the object, both end portions of the front surface 1-1 of the casing are most often held with the user's hand. Therefore, in the camera 1, the air orifices 15 are disposed in a position different from both end portions held by the user (the portions held by the user when a picture of the object is taken, such as both end portions of the front surface 1-1 of the casing of the camera 1, will be referred to hereinbelow as "grip portions").

In particular, in the present embodiment, the air orifices 15 are formed between the cell compartment 18 and the lens-barrel 14. Therefore, the probability of the air orifices 15 being closed by the user's fingers is low.

Figure 3:
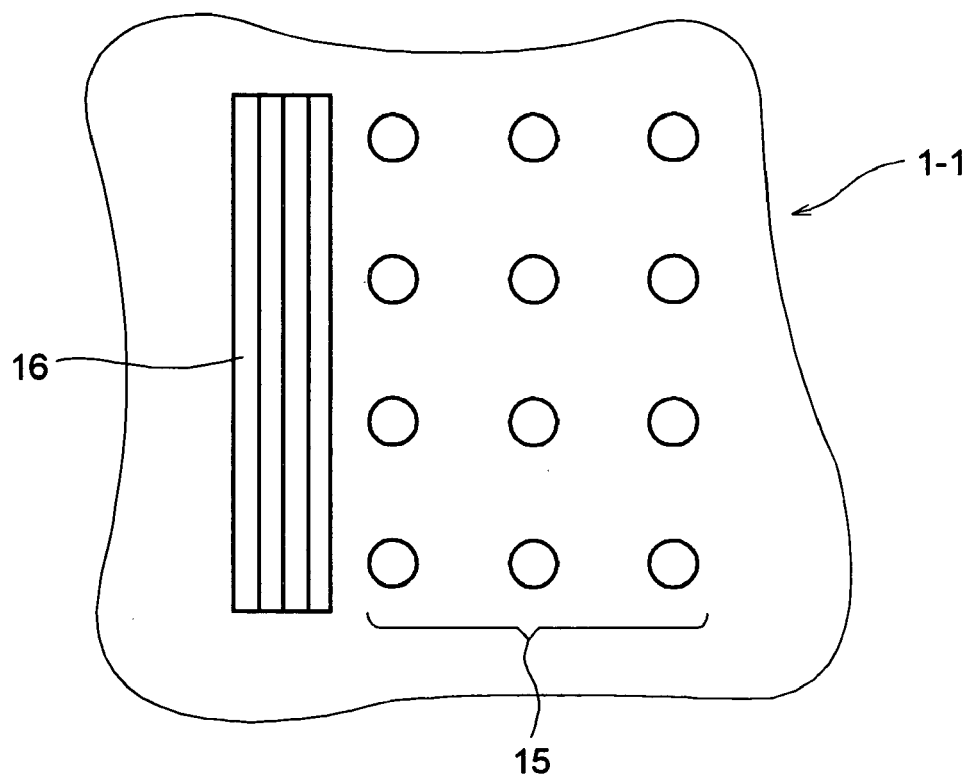
FIG. 3 is an enlarged view of the periphery where the air orifices and air orifice guard are disposed, in the front view in FIG. 1.
Figure 4:
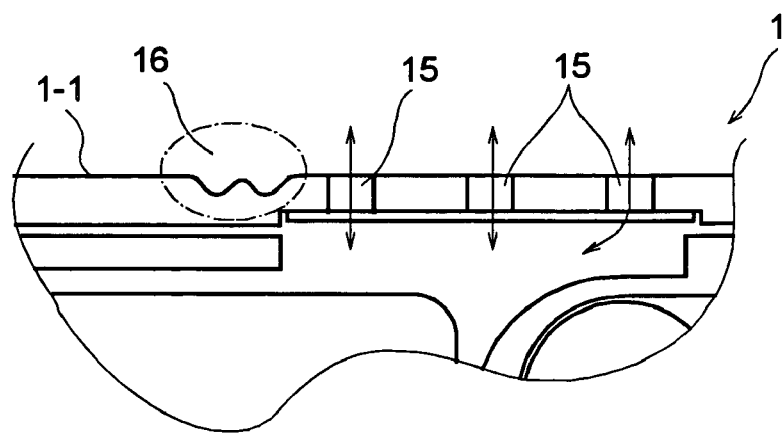
FIG. 4 is an enlarged view of the periphery where the air orifices and air orifice guard are disposed, in the horizontal sectional view of the A-A' portion of the camera shown in FIG. 1.

The air orifice guard 16 is a protrusion or recess formed between the air orifices 15 at the front surface 1-1 of the casing and the grip portion. FIG. 3 and FIG. 4 show the air orifice guard 16 of this example in greater detail. FIG. 3 is an enlarged view of the periphery of the air orifices 15 and air orifice guard 16 at the front surface 1-1 of the casing of the camera 1 shown in FIG. 1. Further, FIG. 4 is a enlarged view of the periphery of the air orifices 15 and air orifice guard 16 in the horizontal cross-sectional view (below-described FIG. 5) of the A-A' portion of the camera 1 shown in FIG. 1.

As shown in FIG. 3 and FIG. 4, the air orifice guard 16 is formed as a peak-valley portion between the air orifices 15 and grip portion at the front surface 1-1 of the casing of the camera 1. Therefore, the following effect can be produced. Thus, when the user holds the camera 1 with his/her hand and takes a picture of the object, the state in which the user views the object via the finder 13 (FIG. 1) is maintained for a long time. In this state, too, the user can recognize that the air orifices 15 are close to his/her hand by the touch of the hand (by touching the air orifice guard 16), without looking at the position of the air orifices 15. Therefore, the air orifices 15 can be reliably prevented from being closed by the user's hand.

Figure 5:
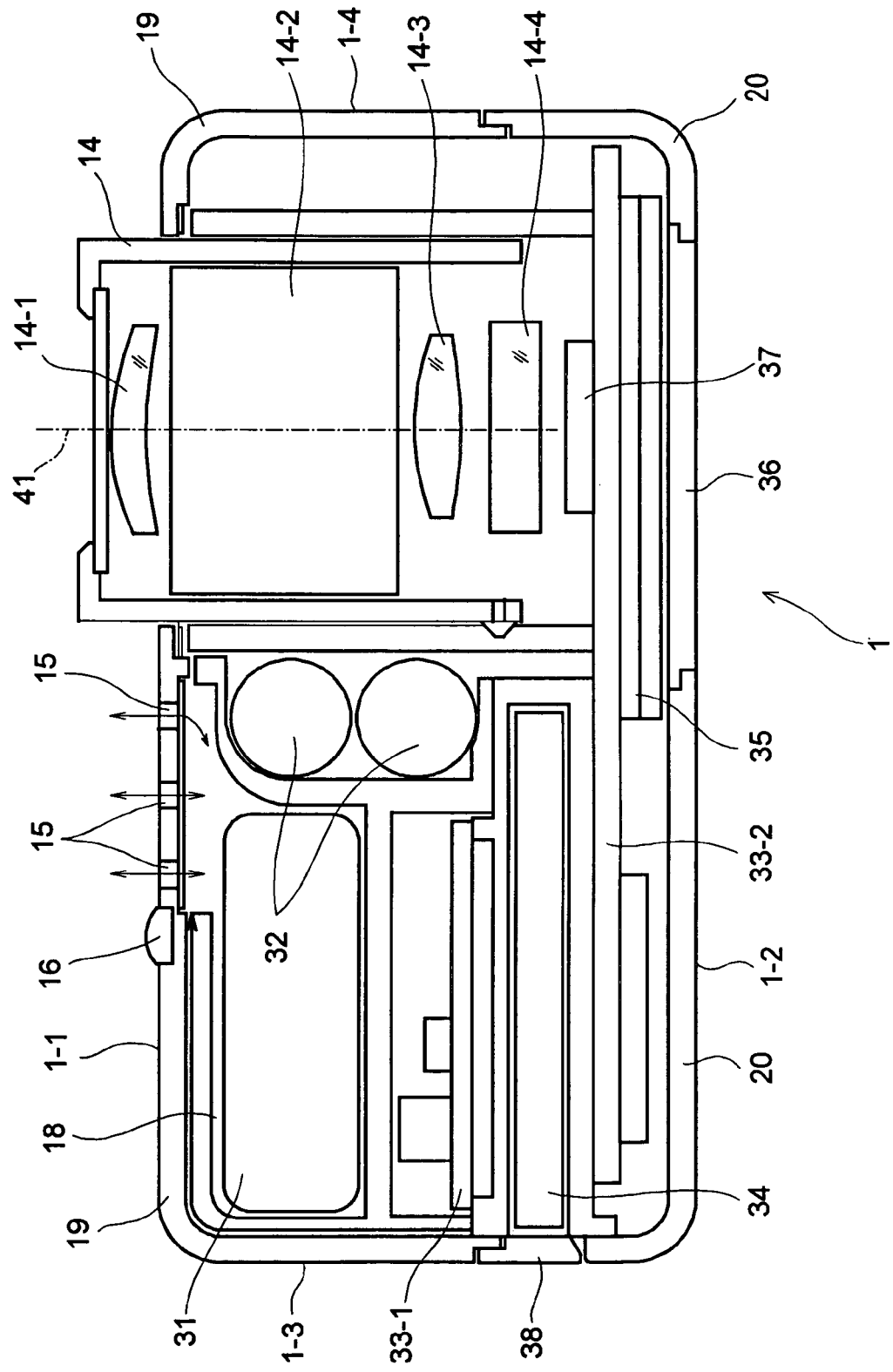
FIG. 5 is a horizontal cross-sectional view of the A-A' portion of the camera shown in FIG. 1.

FIG. 5 is a horizontal cross-sectional view of the A-A' portion of the camera 1 shown in FIG. 1.

Referring to FIG. 5, when the direction from the rear surface 1-2 to the front surface 1-1, among the directions perpendicular to the rear surface 1-2 (the surface 1-2 opposite to the front surface 1-1) of the casing of the camera 1, is taken as the upward direction, the above-mentioned cell compartment 18 for accommodating the fuel cell 31, a circuit substrate 33-1 for carrying a circuit for controlling the operation of the entire camera 1, and a memory card 34 for recording the data of the image picked up by the camera 1 are provided from the top down in the order of description at the left side (by a side surface 1-3 among the side surfaces which are almost perpendicular to the front surface 1-1 of the casing) inside the casing of the camera 1. Furthermore, a circuit substrate 33-2 for carrying a circuit for controlling the operation of the entire camera 1 is provided from the left side of the casing to the right side thereof below the memory card 34.

A memory card lid 38 is provided at the side surface 1-3 of the casing of the camera 1. The memory card lid 38 is opened when the user pulls out the memory card 34 and closed otherwise.

A capacitor 32 for accumulating the energy (electric charge) for causing the light-emitting unit 12 (FIG. 1) to emit light is provided at the right side of the cell compartment 18 and the substrate 33-1 inside the casing of the camera 1, and the lens-barrel 14 is provided at the right side thereof. A lens 14-1, a shutter unit 14-2, a lens 14-3, and a lens 14-4 are provided in the order of description from top down in the lens-barrel 14.

A CCD (Charge Coupled Device) 37 which is an imaging element for taking the picture of the object, the above-mentioned circuit substrate 33-2, and a LCD (Liquid Crystal Display) 35 for displaying the images such as the images of the object picked up with the camera 1 (picked up by the CCD 37) are provided from top down in the order of description below the lens 14-4 also inside the casing of the camera 1.

A LCD window 36 for protecting the LCD 35 is provided at the rear surface 1-2 of the casing of the camera 1, and the user can see the image displayed on the LCD 35 through the LCD window 36.

As described hereinabove, the air orifices 15 for linking the space inside the cell compartment 18 with the outside of the casing of the camera 1 are provided between the lens-barrel 14 and grip portion (end portion at the left side as shown in FIG. 5) at the front surface 1-1 of the casing of the camera 1, and the air orifice guard 16 (recognizable by the touch of the user's hand) for informing the user that the air orifices 15 are close to his/her hand is provided at the right side of the air orifices in the vicinity thereof.

The casing of the camera 1 is composed of a front cover 19 at the side of the front surface 1-1 and a back cover 20 at the side of the rear surface 1-2, the boundary between the covers being almost in the center of the side surface 1-3 and side surface 1-4 of the casing. The back cover 20 can be opened and closed.

Figure 6:
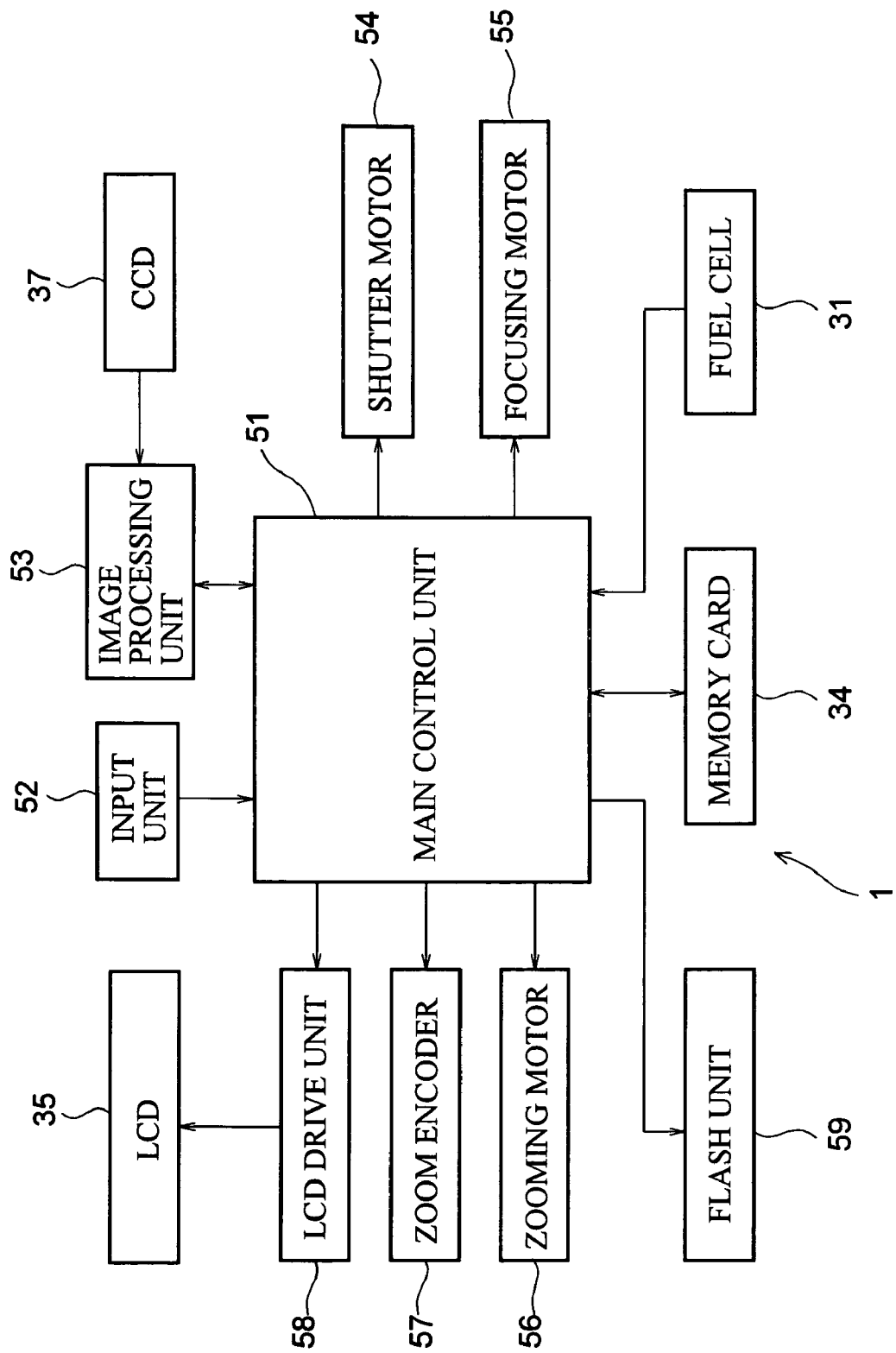
FIG. 6 is a block-diagram illustrating an example of the electric configuration of the camera shown in FIG. 1.

FIG. 6 is a block diagram illustrating an electric configuration of the camera 1.

As shown in FIG. 6, the camera 1 comprises the fuel cell 31 as a power source accommodated in the above-described cell compartment 18 (FIG. 5) and a main control unit 51 for controlling the operation of the entire camera 1.

Thus, a CPU (Central Processing Unit), a ROM (Read Only Memory), a RAM (Random Access Memory), and the like, are provided in the main control unit 51 (those components are not shown in the figure), and the CPU controls the operation of the entire camera 1 according to the program that was loaded into the RAM from the program stored in the ROM or the like. Data necessary for the CPU to execute a variety of processing operations are appropriately stored in the RAM.

In other words, a main control unit 51 controls the components from below-described image processing unit 53 to the flash unit 59 in response to the signals inputted from the below-described input unit 52.

In the camera 1, there are further provided the input unit 52 composed of the above-mentioned release button 11 (FIG. 1), the image processing unit 53 for conducting the prescribed image processing with respect to image signals (image signals picked up with the CCD 37 and converted into analog signals) supplied from the above-mentioned CCD 37, a shutter motor 54 which is contained in the shutter unit 14-2 (FIG. 5), opens a shutter (not shown in the figures) so as to allow the light from the lens 14-1 (FIG. 5) to pass within the prescribed exposure time once the release button 11 has been pushed, and otherwise closes the shutter, a focusing motor 55 for adjusting the aperture of a diaphragm (not shown in the figures) with respect to the lens 14-1, a zooming motor 56 for extending or contracting the lens-barrel 14 (FIG. 5) for zooming, and a zoom encoder 57 for controlling the zooming motor 56.

The camera 1 further comprises a LCD drive unit. 58 for driving the above-mentioned LCD 35 and a flash unit 59 comprising the above-mentioned light-emitting unit 14 and causing the light-emitting unit 14 to emit the light.

Further, in the present example, the circuits corresponding to the main control unit 51, image processing unit 53, and LCD drive unit 58 are carried, for example, by the above-mentioned circuit substrate 33-1 or circuit substrate 33-2 (FIG. 5). However, because the flash unit 59 has a high-voltage circuit, it is carried by a special substrate (not shown in the figures) which is different from the circuit substrate 33-1 and circuit substrate 33-2.

In the example shown in FIG. 6, only the fuel cell 31 is taken as a power source of the camera 1, but the present invention is not limited to the example shown in FIG. 6, and a secondary battery (not shown in the figures) such as a liquid ion battery may be used together with the fuel cell 31. In this case, a power source control unit (not shown in the figure) can be provided between the main control unit 51, fuel cell 31, and secondary battery. The power source control unit, for example, conducts control (switching control) by selecting either the fuel cell or the secondary battery as the power source for the camera 1, or conducts control by charging the secondary battery from the fuel cell and using the secondary battery as the main power source of the camera 1.

As described hereinabove, the camera 1 employing the first embodiment of the present invention, as shown in FIG. 1 to FIG. 5, comprises the cell compartment 18 for accommodating the fuel cell 31 and the air orifices 15 for linking the space inside the cell compartment 18 with the outside of the casing, those air orifices being disposed in a position different from that of the portion (grip portion) which is held by the user, in the vicinity of the center of the front surface 1-1 of the casing. More specifically, the air orifices 15 are disposed in the vicinity of the lens-barrel 14.

As a result, even when the user takes a picture of the object by holding the camera 1 with his/her hand, the air orifices 15 are not closed by the user's hand, oxygen (air) can be normally supplied to the fuel cell 31 accommodated in the cell compartment 18, and the fuel cell 31 can continuously generate a sufficient quantity of electricity. Therefore, the components from the main control unit 51 to the flash 59 shown in FIG. 6 can operate at all times.

Furthermore, in the camera 1 employing the first embodiment of the present invention, as shown in FIG. 1 to FIG. 5, the air orifice guard 16 is formed in the vicinity of the air orifices 15 on the front surface 1-1 of the casing, on the side opposite to that where the lens-barrel 14 is disposed with respect to the air orifices 15. Therefore, as described above, the below-described effect can be demonstrated.

Thus, even when the user holds the camera 1 with his/her hand and views the object via the finder 13 in order to take a picture of the object, the user can recognize that the air orifices 15 are close to his/her hand by the touch of the hand (by touching the air orifice guard 16), without looking at the position of the air orifices 15. Therefore, the air orifices 15 can be reliably prevented from being closed by the user's hand. As a result, oxygen (air) can be normally supplied to the fuel cell 31 accommodated in the cell compartment 18, the fuel cell 31 can continuously generate a sufficient quantity of electricity, and the components from the main control unit 51 to the flash 59 shown in FIG. 6 can operate at all times.

Second Embodiment

Figure 7:
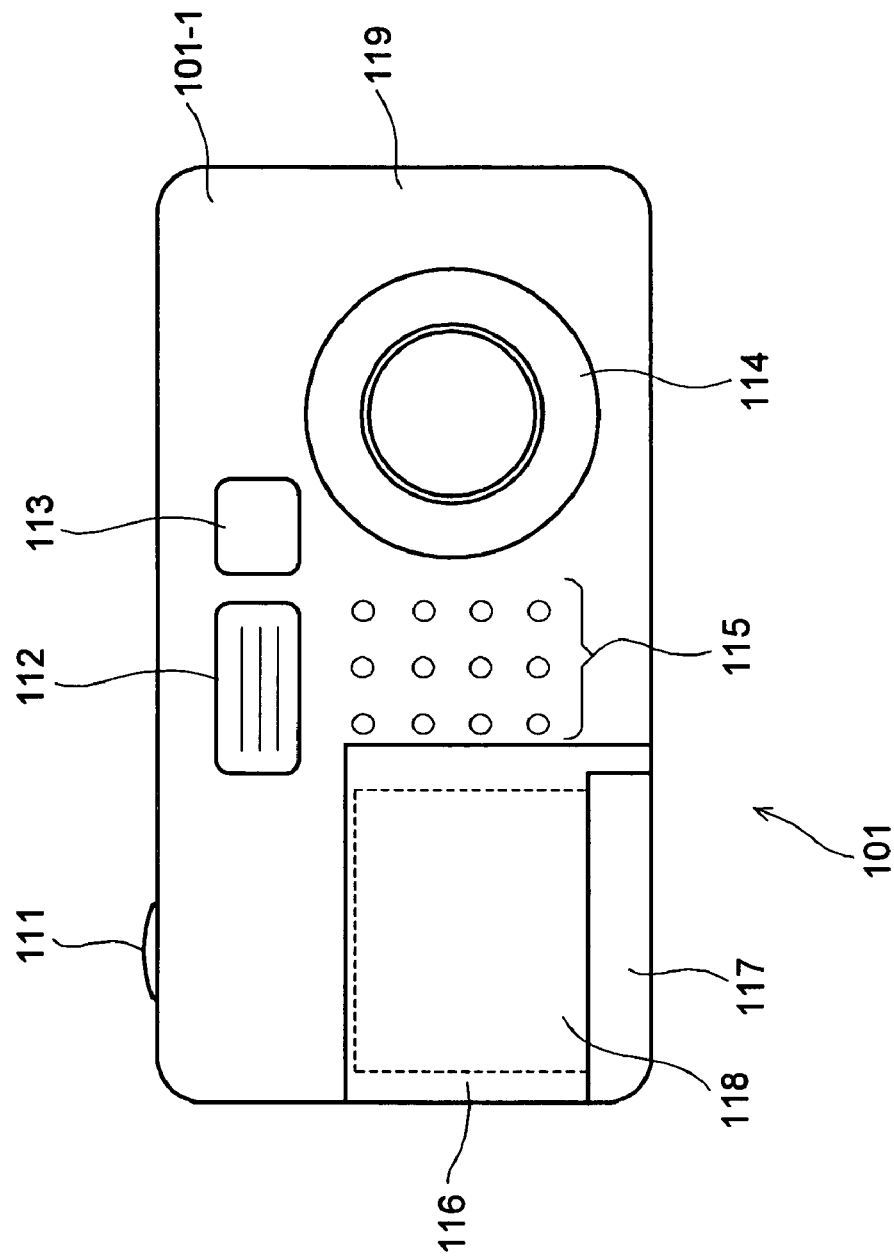
FIG. 7 is a front view illustrating another example of the external configuration of the camera employing the present invention.
Figure 8:
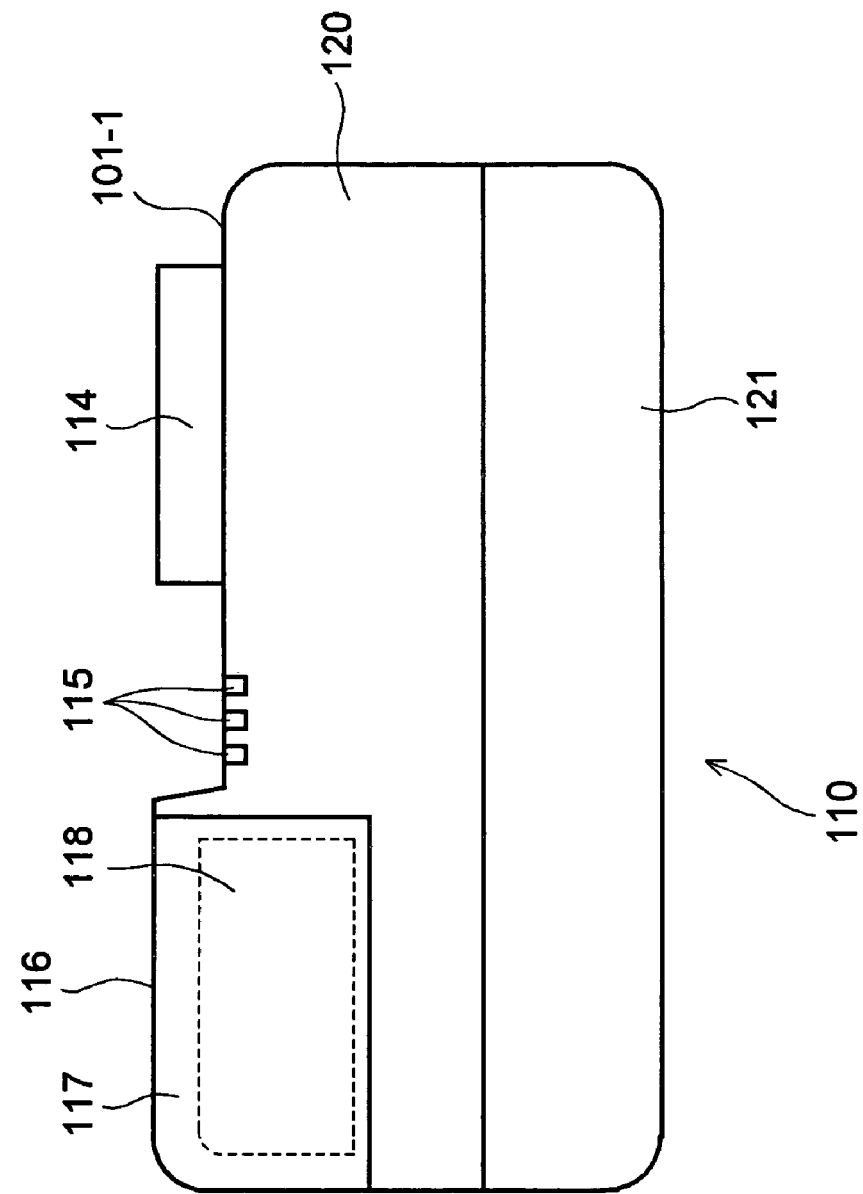
FIG. 8 is a bottom view illustrating an example of the external configuration of the camera shown in FIG. 7.

FIG. 7 illustrates an example of the external configuration of the front surface of a camera as an electronic device employing the second embodiment of the present invention. FIG. 8 represents an example of the external configuration of the lower surface of the camera 101 shown in FIG. 7.

In the example shown in FIG. 7 and FIG. 8, the external configuration of the camera 101 is basically identical to that of the camera 1 (FIG. 1 and FIG. 2) of the first embodiment. Thus, a release button 111 to air orifices 115 shown in FIG. 7, as well as a cell compartment 118 and a lid 117 thereof, are composed similarly to the respective components from the release button 11 to the cell compartment 18 shown in FIG. 1 and are disposed in similar positions.

However, in the camera 101, the grip portion 116 itself is formed as a protrusion which protrudes from the front surface 101-1 of the casing, as shown in FIG. 8, instead of using the air orifice guard 16 (FIG. 1 to FIG. 5).

Furthermore, the electric configuration of the camera 101 in this example is identical to that of the camera 1 of the first embodiment. Thus, FIG. 6 is a block diagram representing also the electric configuration of the camera 101.

As described hereinabove, in the camera 101 which utilizes the second embodiment of the present invention, there are provided, as shown in FIG. 7 and FIG. 8, the cell compartment 118 for accommodating the fuel cell (not shown in the figure, but it is identical to the fuel cell 31 shown in FIG. 5) and the air orifices 115 for linking the space inside the cell compartment 118 with the outside of the casing, those air orifices being disposed in a position different from that of the portion (grip portion 116) which is held by the user, in the vicinity of the center of the front surface 101-1 of the casing. More specifically, the air orifices 115 are disposed in the vicinity of the lens-barrel 114.

As a result, similarly to the camera 1 (FIG. 1 through FIG. 5) of the first embodiment, even when the user takes a picture of the object by holding the camera 101 with his/her hand, the air orifices 115 are not closed by the user's hand, oxygen (air) can be normally supplied to the fuel cell accommodated in the cell compartment 118, and the fuel cell can continuously generate a sufficient quantity of electricity. Therefore, the components from the main control unit 51 to the flash 59 shown in FIG. 6 can operate at all times.

Furthermore, in the camera 101 employing the second embodiment of the present invention, as shown in FIG. 8, the grip portion 116 (the protrusion which protrudes from the front surface 1-1) is formed in the vicinity of the air orifices 115 on the front surface 1-1 of the casing, on the side opposite to that where the lens-barrel 14 is disposed with respect to the air orifices 115. As a result, the air orifices 115 can be reliably prevented from being closed by the user's hand. Therefore, oxygen (air) can be normally supplied to the fuel cell accommodated in the cell compartment 118, the fuel cell can continuously generate a sufficient quantity of electricity, and the components from the main control unit 51 to the flash 59 shown in FIG. 6 can operate at all times.

Third Embodiment

Figure 9:
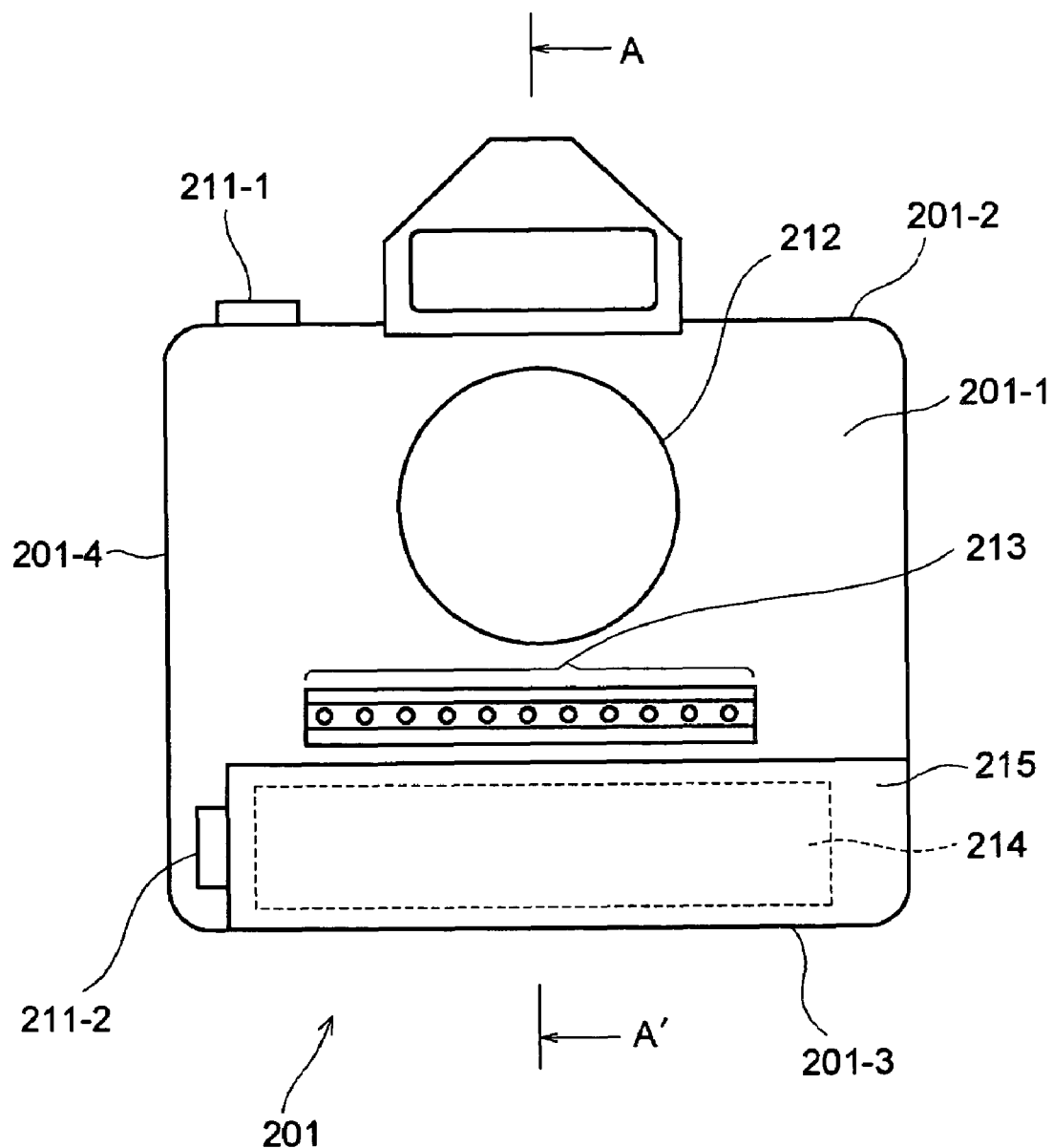
FIG. 9 is a front view illustrating another example of the external configuration of the camera employing the present invention.

FIG. 9 illustrates an example of the external configuration of the front surface of a camera as an electronic device employing the third embodiment of the present invention.

As shown in FIG. 9, a release button 211-1 is provided on the upper surface 201-2 of the casing of the camera 201.

In almost the center of the front surface 201-1 of the casing of the camera 201, there are provided a detachable lens-barrel 212 comprising taking lenses (not shown in the figure), air orifices 213 for linking the space inside the cell compartment 214 for accommodating a fuel cell (for example, a fuel cell 228 shown in the below-described FIG. 10) with the outside of the casing of the camera 201, and a grip portion 215 which is held by the user when the user takes a picture by holding the camera 201 so that the side surface 201-4 is the upper surface (this taking position will be referred to hereinbelow as "vertical position; the grip portion in the vertical position will be referred to as "vertical position grip portion"), those components being provided in the order of description from top down. The release button 211-2 for a vertical position is provided at the left end of the vertical position grip portion 215.

Figure 10:
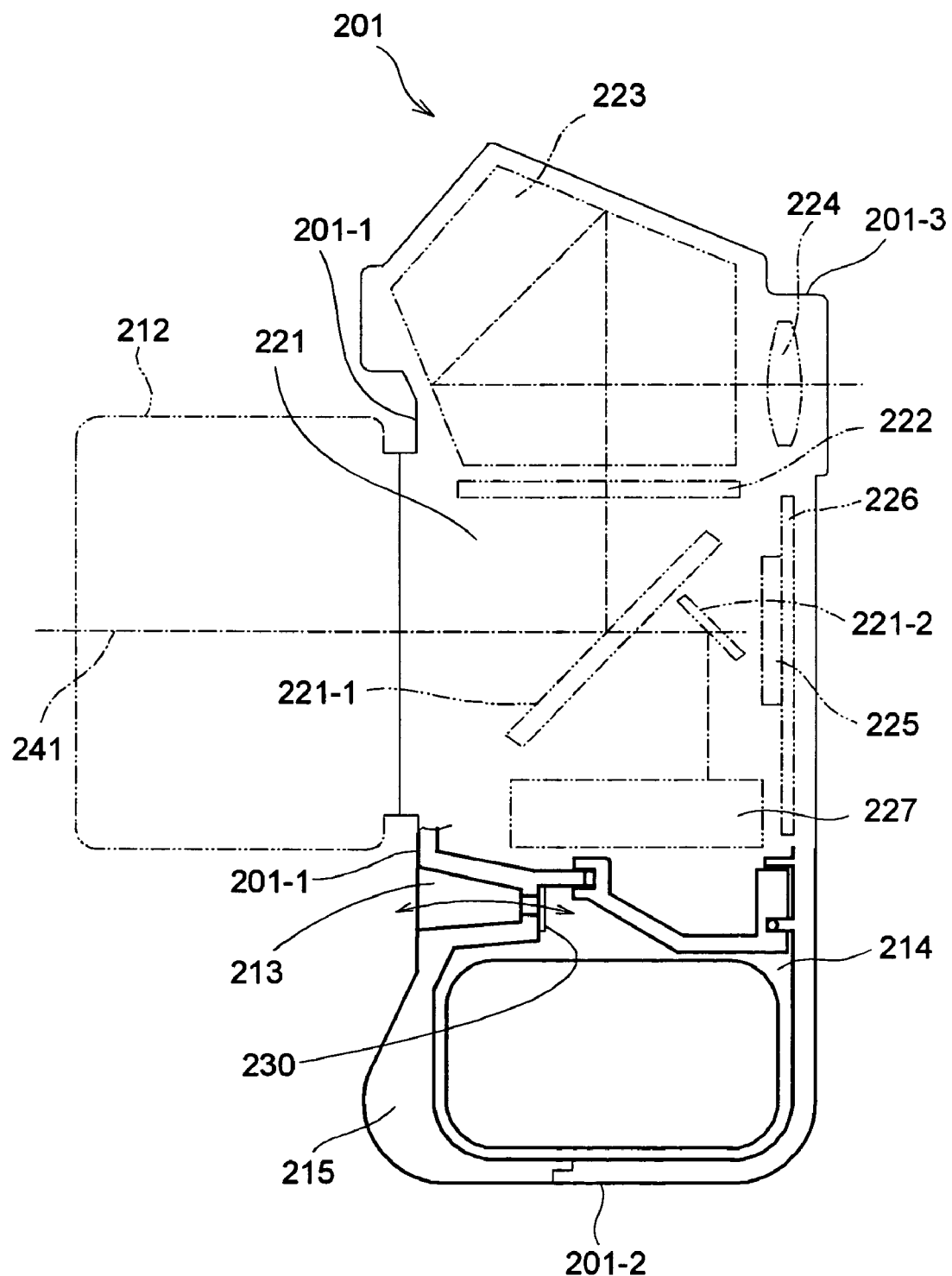
FIG. 10 is a vertical cross-sectional view of the A-A' portion of the camera shown in FIG. 9.

FIG. 10 is a vertical cross-sectional view of the A-A'portion of the camera 201 shown in FIG. 9.

As shown in FIG. 10, inside the casing of the camera 201, a mirror box 221 composed of a main mirror 221-1 and a sub-mirror 221-2 is provided at the right side of the aforementioned lens-barrel 212, a screen 222 is provided above the main mirror 221-1, a penta prism 223 is provided above the screen, and an ocular 224 is provided at the right side of the penta prism. The user takes a picture of an object positioned opposite the lens-barrel 212 (positioned in the direction of a taking optical axis 241), and the user views the object with the ocular 224 via the taking lens of the lens-barrel 212, main mirror 221-1, screen 222, and penta prism 223.

Further, inside the casing of the camera 201, an autofocus module 227 is provided below the sub-mirror 221-2, and a CCD (Charge Coupled Device) 225 which is an imaging element for taking the picture of the object and a substrate 226 which carries the circuitry for controlling the operation of the entire camera 201 are provided in the order of description, from left to right, at the right side of the sub-mirror 221-2.

Further, the components from the mirror box 221 through the autofocus module 227 are not directly related to the present invention and can be readily understood by a person skilled in the art. For this reason, the explanation thereof is herein omitted.

Further, inside the casing of the camera 201, the above-described cell compartment 214 for accommodating the fuel cell 228 is provided below the autofocus module 227.

The aforementioned air orifices 213 are provided below (in the vicinity of) the lens-barrel 212 at the front surface 201-1 of the casing of the camera 201, and the aforementioned vertical position grip portion 215 is provided below the air orifices. The vertical position grip portion 215 is formed as a protrusion which protrudes from the main surface 201-1, similarly to the grip portion 116 (FIG. 8) of the camera 201 of the second embodiment.

The electric configuration of the camera 201, for example, may be similar to that of the camera 1 of the first embodiment. Thus, FIG. 6 is a block diagram representing also the electric configuration of the camera 201.

As described hereinabove, in the camera 201 which utilizes the third embodiment of the present invention, there are provided, as shown in FIG. 9 and FIG. 10, the cell compartment 214 for accommodating the fuel cell 228 and the air orifices 213 for linking the space inside the cell compartment 214 with the outside of the casing, those air orifices being disposed in a position different from that of the portion (vertical position grip portion 215 or grip portion of usual taking position (both end portions of the front surface 201-1 in FIG. 9)) which is held by the user, in the vicinity of the center of the front surface 201-1 of the casing. More specifically, the air orifices 213 are disposed in the vicinity of the lens-barrel 212 (below the lens-barrel 212, as shown in FIG. 10).

As a result, when the user takes a picture of the object by holding the camera 201 with his/her hand, the air orifices 213 are not closed by the user's hand, oxygen (air) can be normally supplied to the fuel cell 228 accommodated in the cell compartment 214, and the fuel cell 228 can continuously generate a sufficient quantity of electricity, regardless of whether the taking position is the usual taking position (position in which the side surface 201-3 is the upper surface) or a vertical position (position in which the side surface 201-4 is the upper surface). Therefore, the components from the main control unit 51 to the flash 59 shown in FIG. 6 can operate at all times.

Furthermore, in the camera 201 employing the third embodiment of the present invention, as shown in FIG. 9 and FIG. 10, the vertical position grip portion 215 (protrusion which protrudes from the front surface 201-1) is formed in the vicinity of the air orifices 213 on the front surface 201-1 of the casing, on the side (lower side as shown in FIG. 10) opposite to that (upper side as shown in FIG. 10) where the lens-barrel 212 is disposed with respect to the air orifices 213. As a result, when the user holds the camera 201 by the vertical position grip portion 215, similarly to the grip portion 116 (FIG. 8) of the second embodiment, the air orifices 213 can be reliably prevented from being closed by the user's hand. Therefore, oxygen (air) can be reliably supplied to the fuel cell 228 accommodated in the cell compartment 214, the fuel cell can continuously generate a sufficient quantity of electricity, and the components from the main control unit 51 to the flash 59 shown in FIG. 6 can operate at all times.

Fourth Embodiment

Figure 11:
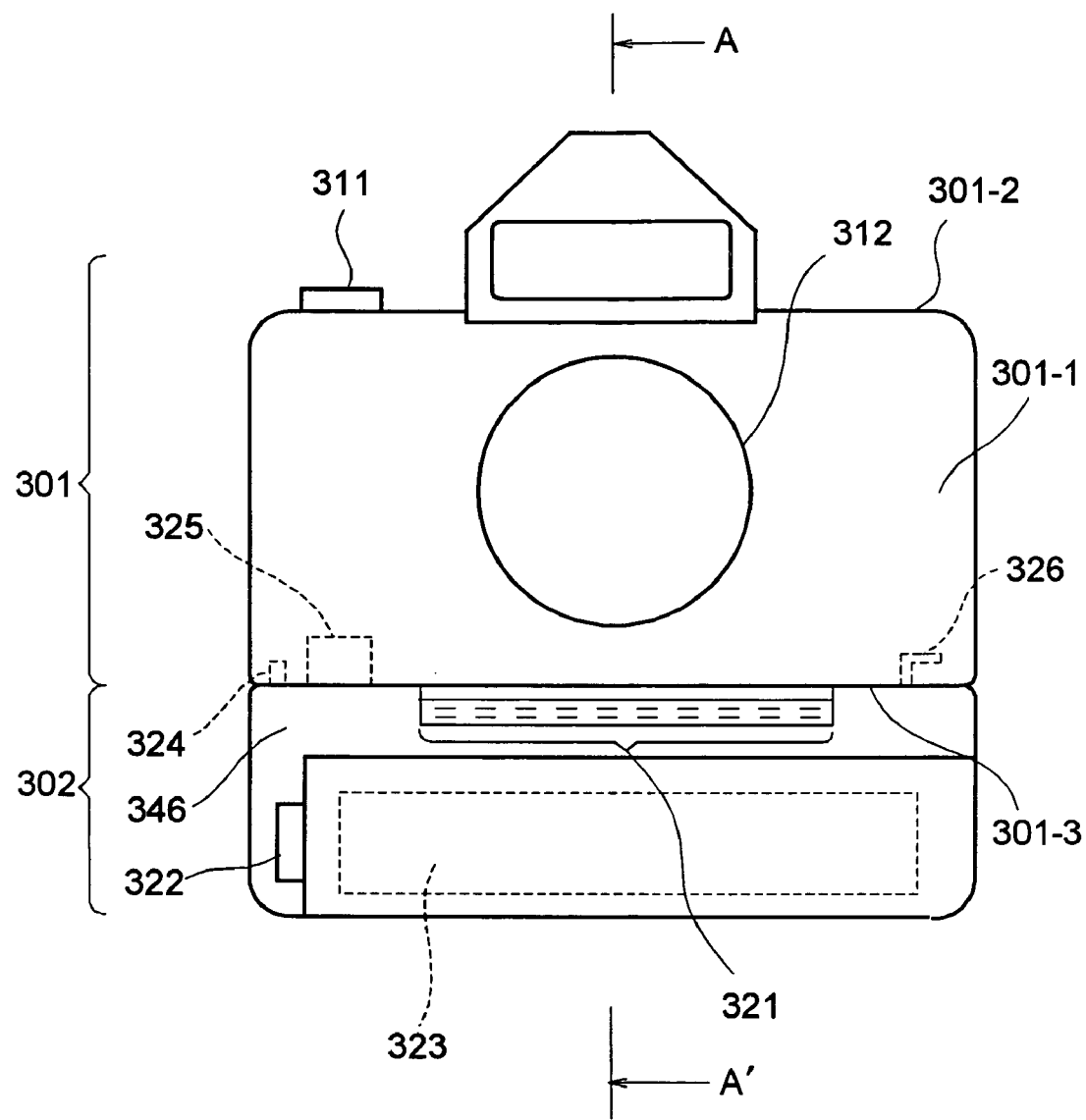
FIG. 11 is a front view illustrating an example of the external configuration of the camera employing the present invention, wherein an auxiliary unit is connected to the camera.

FIG. 11 represents an example of the external configuration of a camera as an electronic device employing the fourth embodiment of the present invention, wherein an auxiliary unit is connected to the camera.

Figure 12:
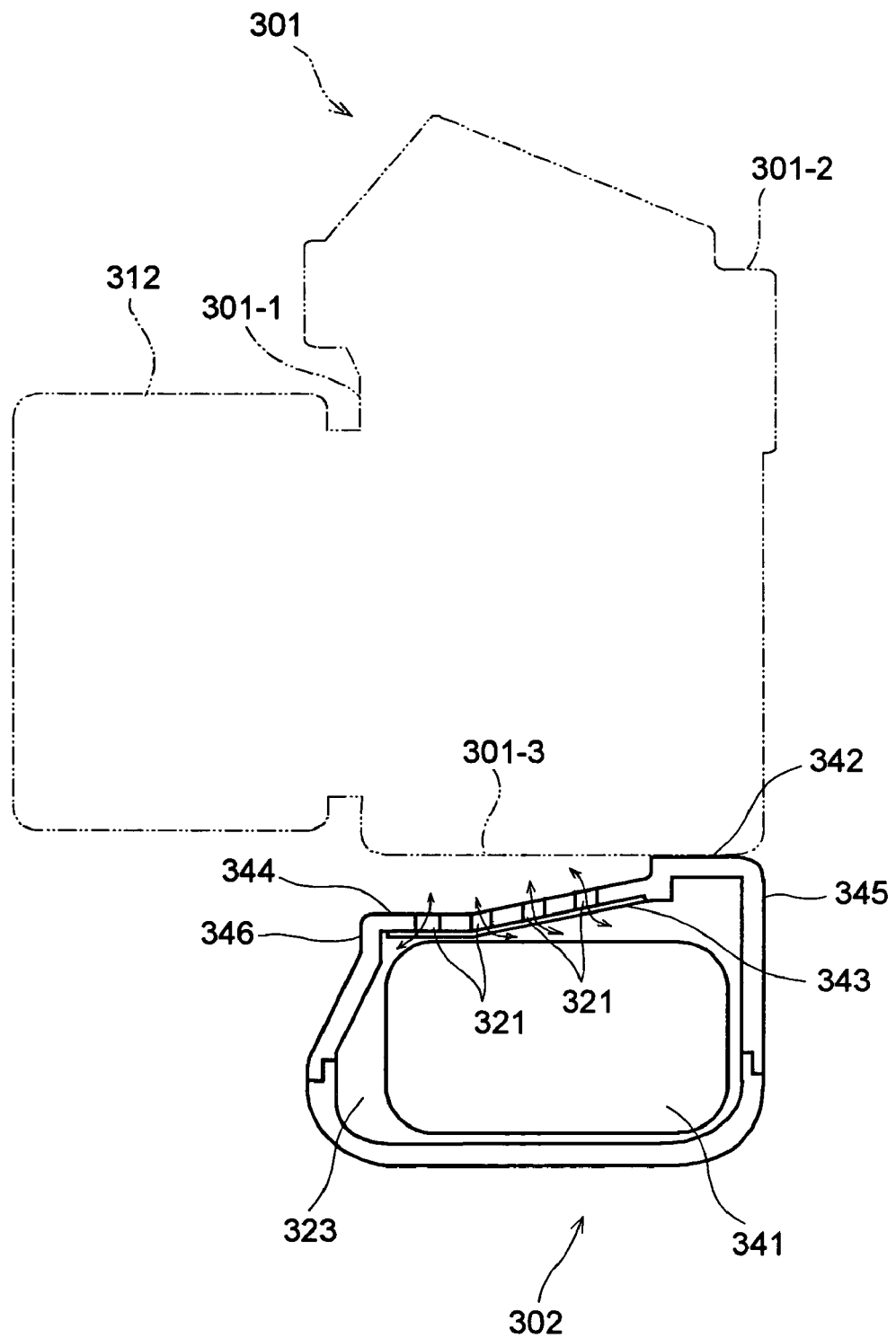
FIG. 12 is a vertical cross-sectional view of the A-A' portion of the auxiliary unit of the camera shown in FIG. 11.

FIG. 12 is a vertical cross-sectional view of the A-A' portion of a vertical position grip 302 connected to a camera 301 shown in FIG. 11.

As shown in FIG. 11, in the fourth embodiment, the vertical position grip 302 corresponding to the vertical position grip portion 215 of the camera 201 (FIG. 9 and FIG. 10) of the third embodiment is detachable from the camera 301.

In other words, in the camera 301 shown in FIG. 11, the vertical position grip portion 215 was separated from the camera 201 of the third embodiment. Therefore, the configuration (external appearance, inside the casing, electric configuration, and the like) of the camera 301 is essentially identical to that of the camera 201 and the explanation thereof is therefore omitted.

A cell compartment for accommodating a fuel cell is contained in the below-described vertical position grip 302. In this example, the camera 301 has a power source (not shown in the figure) different from the fuel cell and, as will be described hereinbelow, the fuel cell accommodated in the vertical position grip 302 can be used as a power source of the camera only when the vertical position grip 302 is connected thereto.

The configuration of the vertical position grip 302 employing the fourth embodiment of the present invention is basically identical to that of the vertical position grip portion 215 (FIG. 9 and FIG. 10) of the third embodiment. Thus, in the vertical position grip 302, as shown in FIG. 11, a release button 322 for a vertical position is provided at the left end of the protrusion protruding from the front surface 346 of the casing and, as shown in FIG. 12, a cell compartment 323 for accommodating a fuel cell 341 is provided inside the casing.

However, the vertical position grip 302, as was described hereinabove, can be detached from the camera 301. Therefore, in the vertical position grip 302, as shown in FIG. 11, a positioning pin 324, a tripod threaded portion 325, and a hook 326 are provided as connection portions for connecting to the camera 301 at the upper surface of the casing (more specifically, at the below-described connection surface 342 shown in FIG. 12 and FIG. 13). As shown in FIG. 12, the air orifices 321 for linking the space inside the cell compartment 323 with the outside of the casing are provided at the surface 344 which is positioned below the connection surface 342 (the surface 342 where the connection portions are disposed) when the vertical position grip 302 is connected to the camera 301 with those connection portions (positioning pin 324, tripod threaded portion 325, and hook 326),.

A water repellent sheet 343 is provided between the air orifices 321 and the inside of the casing. This water repellent sheet 343 is a sheet having air permeability which is employed for the purpose of preventing dust and moisture from penetrating into the casing. It is also appropriately provided for the purpose in the below-described other embodiments.

Thus, when connection portions (positioning pin 324, tripod threaded portion 325, and hook 326) are connected to the camera 301 (a state in which the bottom surface 301-3 of the casing of the camera 301 is in contact with the connection surface 342 of the vertical position grip 302), the air orifices 321 are disposed at the surface 344 which faces the bottom surface 301-3 of the camera 301, without contact therewith. Therefore, they are at a certain distance from the bottom surface 301-3 of the camera 301 (a gap is present at the left side, as shown in FIG. 12).

Therefore, even when the vertical position grip 302 is connected to the camera 301, the air orifices 321 are not closed by the camera 301, oxygen (air) can be reliably supplied to the fuel cell 341 accommodated in the cell compartment 323, and the fuel cell can continuously generate a sufficient quantity of electricity.

Figure 13:
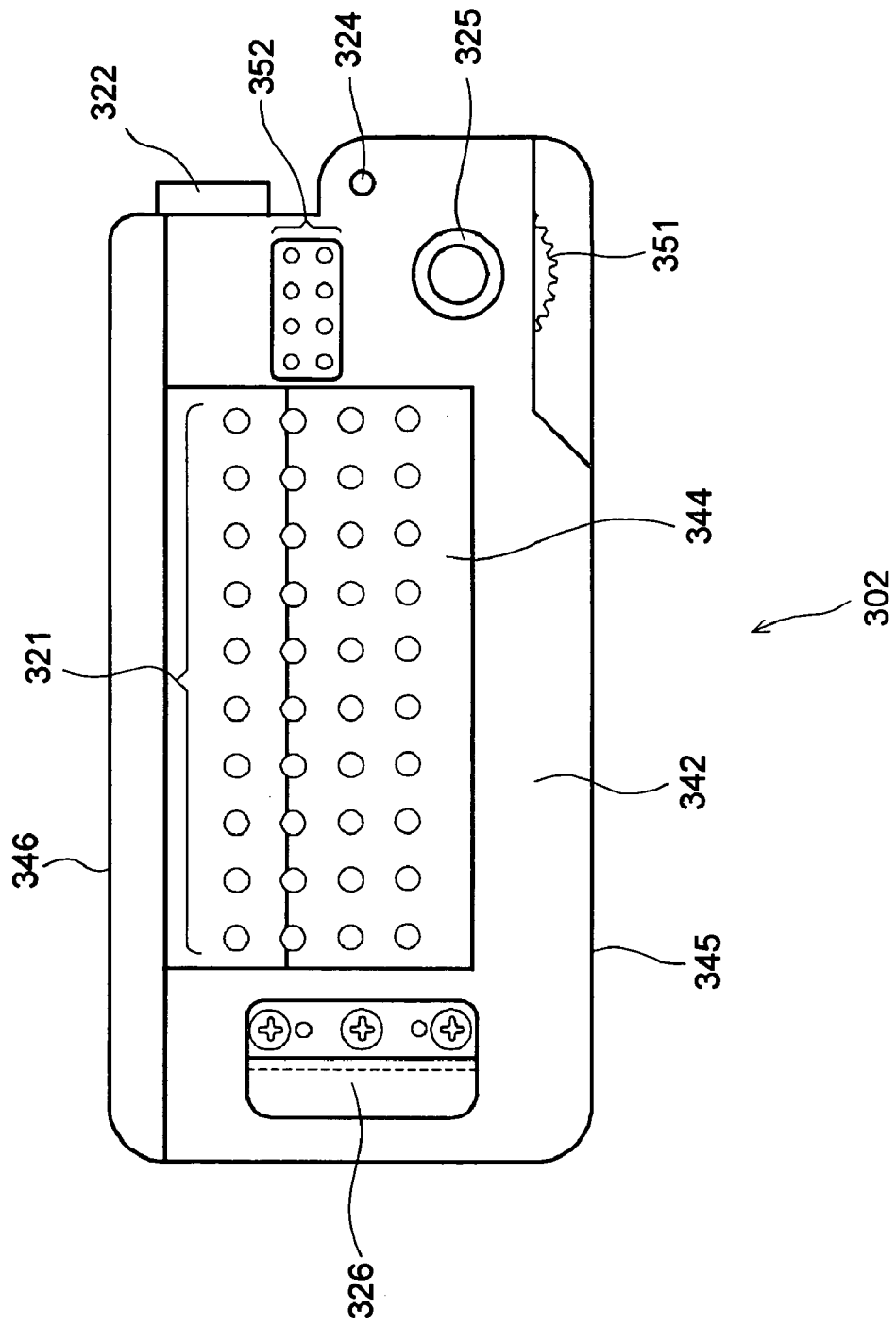
FIG. 13 is a top view illustrating an example of the external configuration of the auxiliary unit of the camera shown in FIG. 11.

FIG. 13 is a top surface view of the vertical position grip 302.

In FIG. 13, for example, among the normal directions to the rear surface 345 of the vertical position grip 302, the direction from the rear surface 345 to the front surface 346 where the protrusion is located is taken as an upward direction.

As shown in FIG. 13, the above-mentioned hook 326 is provided at the left end portion of the connection surface 342 of the vertical position grip 302, and a power supply signal pin 352 for supplying electric power from the fuel cell 341 (FIG. 12) accommodated in the cell compartment 323 to the camera 301, the above-mentioned positioning pin 324, the tripod threaded portion 325, and a tripod thread rotation control portion 351 are provided from top down in the order of description in the end portion at the right side (side where the release button 322 is disposed) from the hook.

A surface 344 where the aforementioned air orifices 321 are disposed is formed in the vertical position grip 302 in the center of the upper surface thereof (within the connection surface 342). In other words, the connection surface 345 is formed as a protrusion protruding from the surface 344.

As described hereinabove, in the vertical position grip 302 employing the fourth embodiment of the present invention, there are provided, as shown in FIG. 11 to FIG. 13, the cell compartment 323 for accommodating the fuel cell 341, the positioning pin 324, tripod threaded portion 325, and hook 326 serving as the connection portions for connecting to the camera 301, and the air orifices 321 for linking the space inside the cell compartment 323 with the outside of the casing, those air orifices being disposed at the surface 344 in the vicinity of those connection portions (the connection surface 342 where they are disposed), among the surfaces of the casing. Further, as shown in FIG. 12, when the camera 301 is connected to the connection portions, surface 344 where the air orifices 321 are disposed faces the bottom surface 301-3 of the camera 301, without contact therewith. In other words, as shown in FIG. 12, the surface 344 where the air orifices 321 are disposed is at a certain distance from the camera 301 when the connection portions (positioning pin 324, tripod threaded portion 325, and hook 326) are connected to the camera 301.

As a result, even when the vertical position grip 302 is connected to the camera 301, the air orifices 321 are not closed by the camera 301, oxygen (air) can be reliably supplied to the fuel cell 341 accommodated in the cell compartment 323, and the fuel cell 341 can continuously generate a sufficient quantity of electricity. Therefore, when the vertical position grip 302 is connected to the camera 301, electric power can be reliably supplied from the fuel cell 341 to the camera 301 via the power supply signal pin 352. As a result, the components from the main control unit 51 to the flash 59 shown in FIG. 6 can operate at all times.

The vertical position grip 302 can be connected not only to the camera 301 shown in FIG. 11 and FIG. 12, but to a variety of cameras.

Fifth Embodiment

Figure 14:
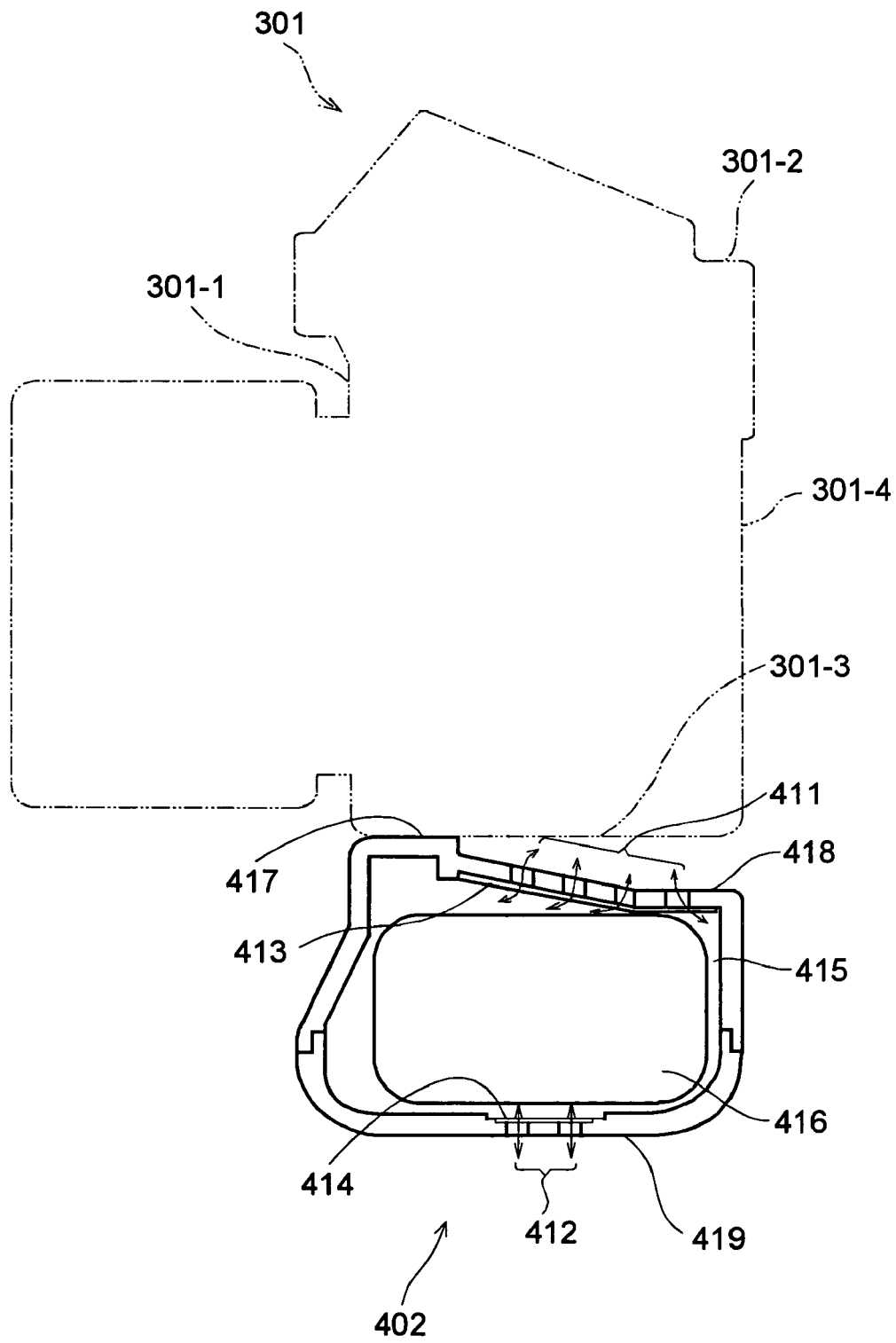
FIG. 14 is a vertical cross-sectional view of the central portion of the front surface of the casing of the auxiliary unit of the camera of another example using the present invention, wherein the auxiliary unit is connected to the camera.

FIG. 14 is a vertical cross-sectional view taken in the vicinity of the central portion of the front surface of an auxiliary unit for a camera as an electronic device employing the fifth embodiment of the present invention, wherein the auxiliary unit is connected to the camera.

The vertical position grip 402 of the fifth embodiment, for example, has a configuration basically identical to that of the vertical position grip 302 (FIG. 11 to FIG. 13) of the fourth embodiment.

Thus, similarly to the vertical position grip 302 (FIG. 11 to FIG. 13), a release button (not shown in the figures, but is similar to the release button 322 shown in FIG. 1) is provided at the front surface of the casing of the vertical position grip 402, and a cell compartment 415 for accommodating a fuel cell 416 is provided inside the casing, as shown in FIG. 14.

Similarly to the vertical position grip 302 (FIG. 11 to FIG. 13), connection portions (not shown in the figure, but are similar to the positioning pin 324, tripod threaded portion 325, and hook 326 shown in FIG. 11) for connecting to the camera 301 are also provided, in the vertical position grip 402, and the vertical position grip can be detachably attached to the camera 301 with those connection portion.

Further, as shown in FIG. 14, when the vertical position grip 402 and the camera 301 are connected to each other with the connection portions, the connection surface 417 is provided at the left side (side of the front surface 301-1 of the camera 301), and the surface 418 where the air orifices 411 are disposed is provided at the right side (side of the rear surface 301-4 of the camera 301). A water repellent sheet 413 is provided between the air orifices 411 and the inside of the casing.

Thus, similarly to the air orifices 321 (FIG. 12) of the fourth embodiment, when the camera 301 is connected to the connection portions (a state in which the connection surface 417 and the bottom surface 301-3 of the camera 301 are in contact) the air orifices 411 are disposed at the surface 418 which faces the bottom surface 301-3 of the camera 301, but is not in contact therewith. Therefore, they are separated by a certain distance from the camera 301 (a gap is present at the right side).

Therefore, even when the vertical position grip 402 is connected to the camera 301, the air orifices 411 are not closed by the camera 301, oxygen (air) can be reliably supplied to the fuel cell 416 accommodated in the cell compartment 415, and the fuel cell can continuously generate a sufficient quantity of electricity.

Further, in the vertical position grip 402, air orifices 412 for linking the space inside the cell compartment 415 to the outside of the casing are also provided at the bottom surface 419 (the surface 419 facing the surface 418 where the air orifices 411 are disposed and the connection surface 417) of the casing. A water repellent sheet 414 is provided between the air orifices 412 and the inside of the casing.

Thus, in the vertical position grip 402, the air orifices 411 are provided at the surface 418 in the vicinity of the connection surface (upper surface) 417 and the air orifices 412 are additionally provided at the bottom surface 419. Therefore, circulation of air located inside the cell compartment 415 and the outside air can be improved.

Furthermore, for example, when the fuel cell 416 is of a type using a methanol fuel and releasing carbon dioxide, the carbon dioxide which has a high specific gravity is released from the air orifices 412 to the outside of the camera. Therefore, the carbon dioxide can be prevented from accumulating in the bottom portion of the cell compartment 415.

As described hereinabove, in the vertical position grip 402 employing the fifth embodiment of the present invention, there are provided the cell compartment 415 (FIG. 14) for accommodating the fuel cell 416, the connection portions (not shown in the figure, but are similar to the positioning pin 324, tripod threaded portion 325, and hook 326 shown in FIG. 11 and FIG. 13 (similarly to the fourth embodiment)) for connecting to the camera 301, and the air orifices 411 (FIG. 14) for linking the space inside the cell compartment 415 with the outside of the casing, those air orifices being disposed at the surface 418 close to those connection portions (the connection surface 417 where they are disposed), among the surfaces of the casing. Further, as shown in FIG. 14, when the camera 301 is connected to the connection portions, the surface 418 where the air orifices 411 are disposed faces the bottom surface 301-3 of the camera 301, without contact therewith. In other words, as shown in FIG. 14, the surface 418 where the air orifices 411 are disposed is at a certain distance from the camera 301 when the connection portions are connected to the camera 301.

As a result, even when the vertical position grip 402 is connected to the camera 301, the air orifices 411 are not closed by the camera 301, oxygen (air) can be reliably supplied to the fuel cell 416 accommodated in the cell compartment 415, and the fuel cell 416 can continuously generate a sufficient quantity of electricity. Therefore, when the vertical position grip 402 is connected to the camera 301, electric power can be reliably supplied from the fuel cell 416 to the camera 301 via a power supply signal pin (not shown in the figure, but is similar to the power supply signal pin 352 shown in FIG. 13). As a result, the components from the main control unit 51 to the flash 59 shown in FIG. 6 can operate at all times.

The vertical position grip 402 can be connected not only to the camera 301 shown in FIG. 14, but to a variety of cameras.

Sixth Embodiment

As described hereinabove, in the fourth and fifth embodiments, measures aimed at preventing the air orifices, which are disposed at the prescribed surface of the casing of the vertical position grip, from being closed by the camera when the vertical position grip is connected to the camera, were focused on the casing of the vertical position grip.

By contrast, in the sixth embodiment, those measures are focused on the casing of the camera.

Figure 15:
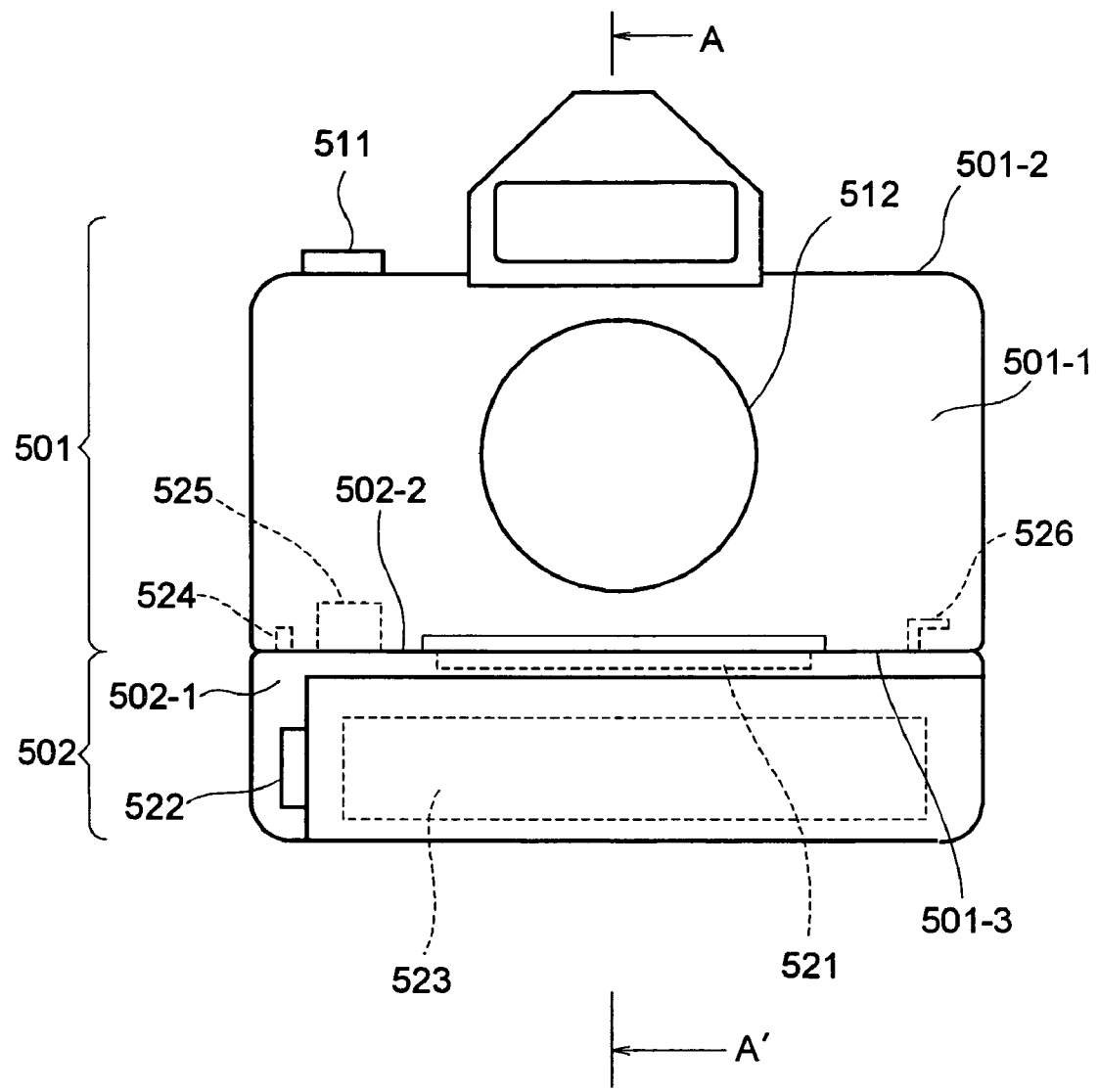
FIG. 15 is a front view illustrating another example of the external configuration of the camera employing the present invention, wherein an auxiliary unit is connected to the camera.

FIG. 15 illustrates the external configuration of the front surface of a camera as an electronic device employing the sixth embodiment of the present invention of the camera employing the present invention, wherein a vertical position grip (auxiliary unit) is connected to the camera.

Figure 16:
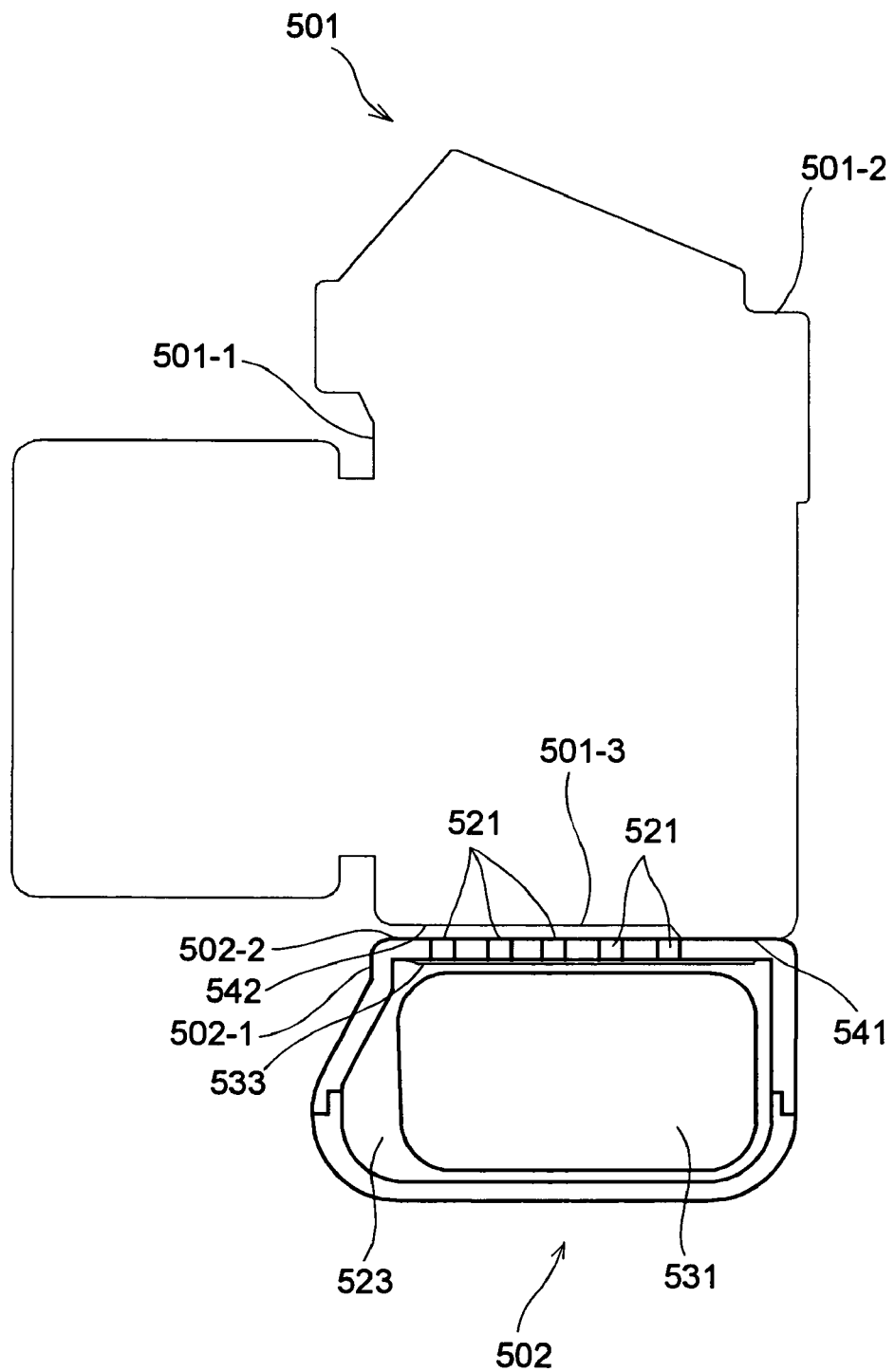
FIG. 16 is a vertical cross-sectional view of the A-A' portion of the auxiliary unit of the camera shown in FIG. 15.

FIG. 16 is a vertical cross-sectional view of the A-A' portion of a camera 501 shown in FIG. 15.

As shown in FIG. 15, the external configuration of the camera 501 is basically identical to that of the camera 301 (FIG. 11) of the above-described third and fourth embodiment. Thus, a release button 511 is provided at the upper surface 501-2 of the casing of the camera 501, and a lens-barrel 512 is provided at the front surface 501-1.

Both the inner structure and electric configuration of the camera 501 are basically identical to those of the camera 301 of the above-described third and fourth embodiment. Therefore, the explanation thereof is omitted.

The external configuration of the vertical position grip 502 which to be connected to the camera 501 is also basically identical to that of the vertical position grip 302 (FIG. 11 to FIG. 13) of the above-described fourth embodiment and, as shown in FIG. 15, a positioning pin 524, a tripod threaded portion 525, and a hook 526 serving as connection portions for connecting to the camera 501 are provided at the upper surface 502-2 of the casing of the vertical position grip 502. A release button 522 for a vertical position is provided in the left end portion of the protrusion protruding from the front surface 502-1.

In the vertical position grip 502, as shown in FIG. 16, there are provided, a cell compartment 523 for accommodating the fuel cell 531 and air orifices 521 for linking the space inside the cell compartment 523 with the outside of the casing. A water repellent sheet 533 is provided between the air orifices 521 and the inside of the casing.

However, as shown in FIG. 16, the air orifices 521 are disposed in the upper surface 502-2 which is the surface where the connection portions (positioning pin 524, tripod threaded portion 525, and hook 526 (FIG. 15)) are disposed and, for example, when the above-described camera 301 (FIG. 12) is connected instead of the camera 501 to the vertical position grip 502, the air orifices 521 are closed by the camera 301.

Therefore, as shown in FIG. 16, a protrusion which protrudes from a surface 542 facing the air orifices 521 of the vertical position grip 502 when the vertical position grip 502 is connected is formed at the bottom surface 501-3 of the casing of the camera 501 and the surface of this protrusion is taken as a connection surface 541. Thus, the connection portion which is to be connected to the positioning pin 524, tripod threaded portion 525, and hook 526 (FIG. 15) of the vertical position grip 502 is provided at the connection surface 541.

As described hereinabove, in the camera 501 employing the sixth embodiment of the present invention, as shown in FIG. 15 and FIG. 16, there are provided the connection portion (connection portion for connecting to the positioning pin 524, tripod threaded portion 525, and hook 526 (FIG. 15) of the vertical position grip 502) for connecting the vertical position grip 502 comprising the cell compartment 523 for accommodating the fuel cell 531 and the air orifices 521 for linking the space inside the cell compartment 523 with the outside of the casing, and a protrusion which protrudes from the surface 542 and is disposed in the vicinity of the surface 542 facing the air orifices 521 when the vertical position grip 502 is connected to that connection portion, and the connection portion is disposed at the surface 541 (connection surface 541) of the protrusion.

As a result, even when the vertical position grip 502 is connected to the camera 501, the air orifices 521 are not closed by the camera 501, oxygen (air) can be reliably supplied to the fuel cell 531 accommodated in the cell compartment 523, and the fuel cell 531 can continuously generate a sufficient quantity of electricity. Therefore, when the vertical position grip 502 is connected to the camera 501, electric power can be reliably supplied from the fuel cell 531 to the camera 501 via a power supply signal pin (not shown in the figure, but is similar to the power supply signal pin 352 shown in FIG. 13). As a result, the components from the main control unit 51 to the flash 59 shown in FIG. 6 can operate at all times.

The camera 501 can be connected not only to the vertical position grip 502 shown in FIG. 16, but also to a variety of devices comprising a cell compartment for accommodating a fuel cell and air orifices for linking the space inside the cell compartment with the outside of the casing.

Seventh Embodiment

As described hereinabove, in the first to third embodiments, when a cell compartment for accommodating a fuel cell was provided in a camera, the air orifices for linking the space inside the cell compartment with the outside of the casing were provided at the front surface of the casing. Therefore, measures were taken to prevent the air orifices from being closed by the user's hand.

By contrast, in the seventh embodiment, as will be described hereinbelow, the air orifices for linking the space inside the cell compartment with the outside of the casing are provided at the bottom surface of the casing. Therefore, measures are taken to prevent the air orifices from being closed by another device when this device is connected to the bottom surface of the casing.

Figure 17:
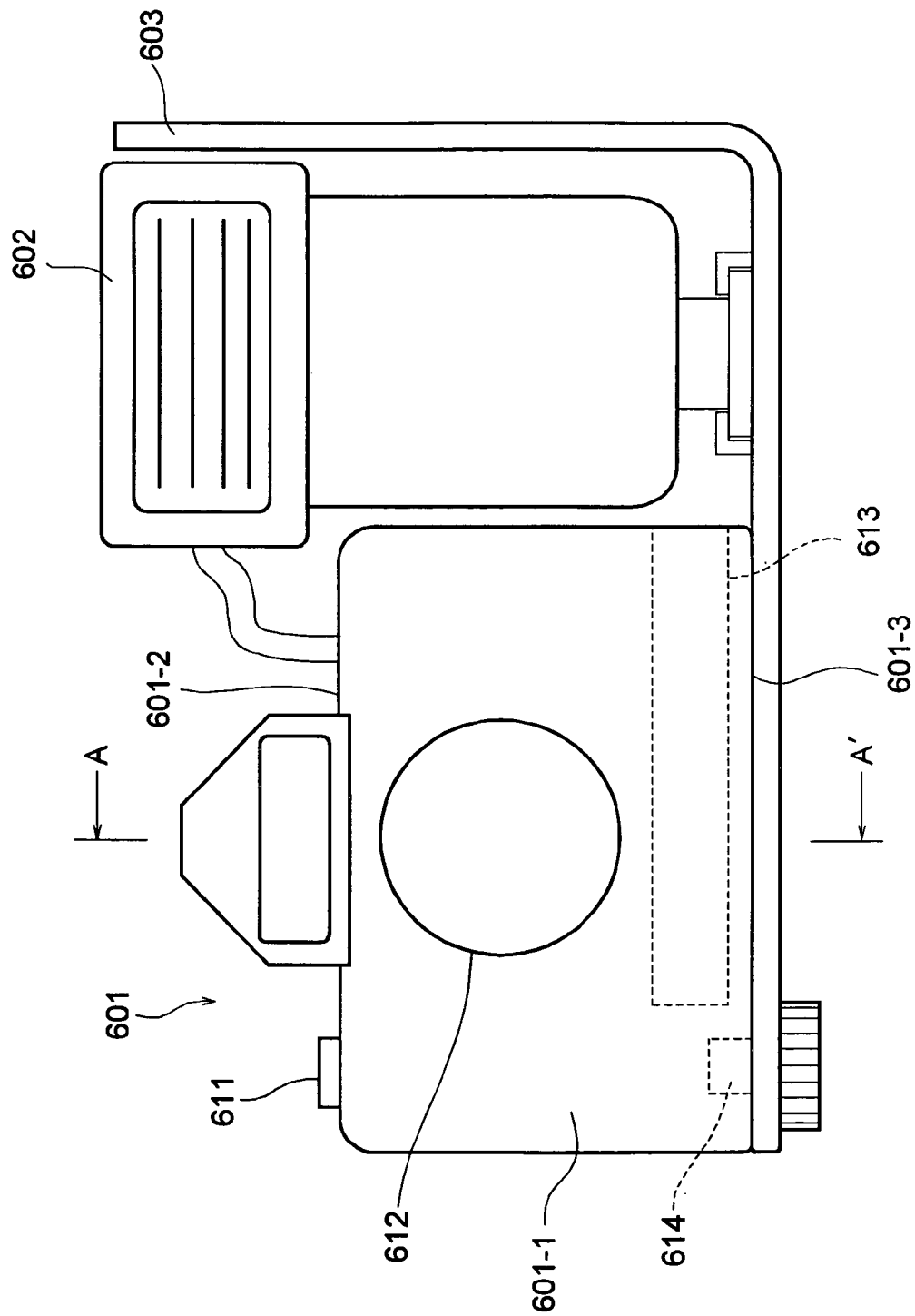
FIG. 17 is a front view illustrating another example of the external configuration of the camera employing the present invention.

FIG. 17 represents an example of external configuration of the front surface of a camera as an electronic device employing such seventh embodiment of the present invention.

Figure 18:
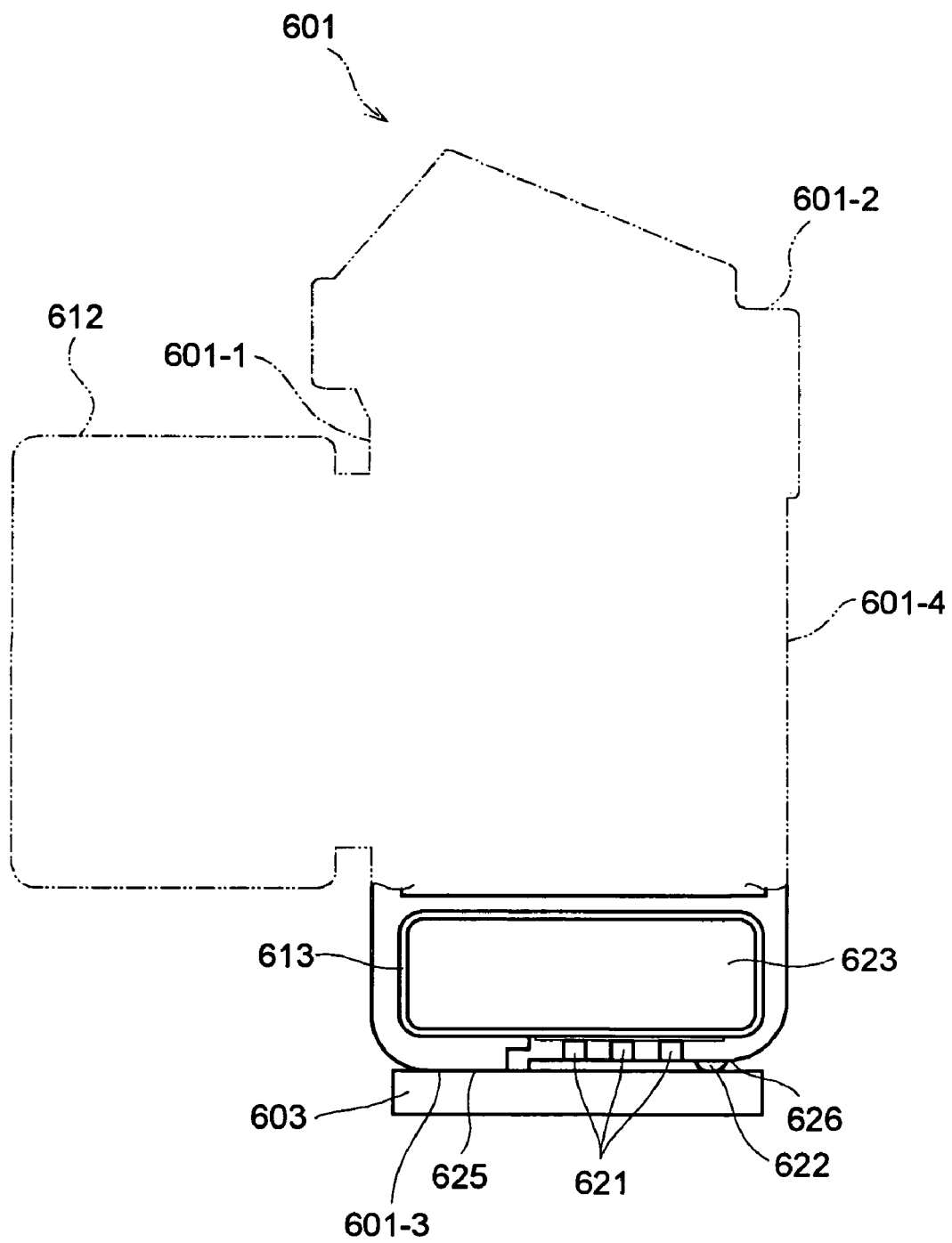
FIG. 18 is a vertical cross-sectional view of the A-A' portion of the auxiliary unit of the camera shown in FIG. 17.

FIG. 18 is a vertical cross-sectional view of the A-A' portion of the camera 601 shown in FIG. 17.

As shown in FIG. 17, a release button 611 is provided at the upper surface 601-3 of the casing of the camera 601, a lens-barrel 612 is provided at the front surface 601-1 thereof, and a connection portion (tripod socket) 614 for connecting to another device is provided at the bottom surface 601-3 thereof.

In the example shown in FIG. 17, an external flash device 602 is connected to the camera 601, and the camera 601 and flash device 602 are fixed by a flash protector 603. Thus, the flash protector 603 is connected to the connection portion 614 of the camera 601. Further, the connection portion 614 can be used for connecting not only the flash protector 603 by also a variety of other devices such as a tripod.

The internal configuration of the camera 601 is basically identical, for example, to that of the camera 201 (FIG. 10) of the third embodiment, but as shown in FIG. 18, air orifices 621 for linking the space inside the cell compartment 613 for accommodating the fuel cell 623 with the outside of the casing are disposed at the bottom surface 601-3 rather than at the front surface 601-1 of the casing.

Further, a protrusion protruding from a surface 626 where the air orifices 621 are disposed is formed at the bottom surface 601-3 of the casing of the camera 601, and the above-described connection portion 614 is disposed at the surface 625 of this protrusion. Thus, the surface 625 where the connection portion 614 is disposed serves as a flash protector 603 of the camera 601.

Furthermore, a spherical protrusion 622 for maintaining a certain distance (a gap is present at the right side) from the flash protector 603 when the flash protector 603 is connected to the connection portion 625 (a state in which the flash protector 603 is in contact with the connection surface 625 of the camera 601) is formed at the surface 626 where the air orifices 621 are disposed, of the bottom surface 601-3 of the casing of the camera 601.

The electric configuration of the camera 601 in this embodiments is taken to be identical, for example, to that of the camera 201 of the third embodiment (camera 1 of the first embodiment). Thus, FIG. 6 is also a block diagram representing the electric configuration of the camera 601.

As described hereinabove, in the camera 601 employing the seventh embodiment of the present invention, as shown in FIG. 17 and FIG. 18, there are provided the cell compartment 613 for accommodating the fuel cell 623, the connection portion 614 for connection to the flash protector 603, and the air orifices 621 for linking the space inside the cell compartment 613 with the outside of the casing, those air orifices being disposed at the surface 626 which is in the vicinity of the connection portion 614 (connection surface 625), of the surfaces of the casing, and as shown in FIG. 18, when the flash protector 603 is connected to the connection surface 625 (connection portion 614 (FIG. 17)), the surface 626 where the air orifices 621 are disposed faces the flash protector 603, without being in contact therewith. In other words, the surface 626 where the air orifices 621 are disposed is at a certain distance from the flash protector 603 when the flash protector 603 is connected to the connection portion 614 (connection surface 625).

As a result, even when the flash protector 603 is connected to the camera 601, the air orifices 621 are not closed by the flash protector 603, oxygen (air) can be reliably supplied to the fuel cell 623 accommodated in the cell compartment 613, and the fuel cell 623 can continuously generate a sufficient quantity of electricity. Therefore, the components from the main control unit 51 to the flash 59 shown in FIG. 6 can operate at all times.

Eighth Embodiment

Figure 19:
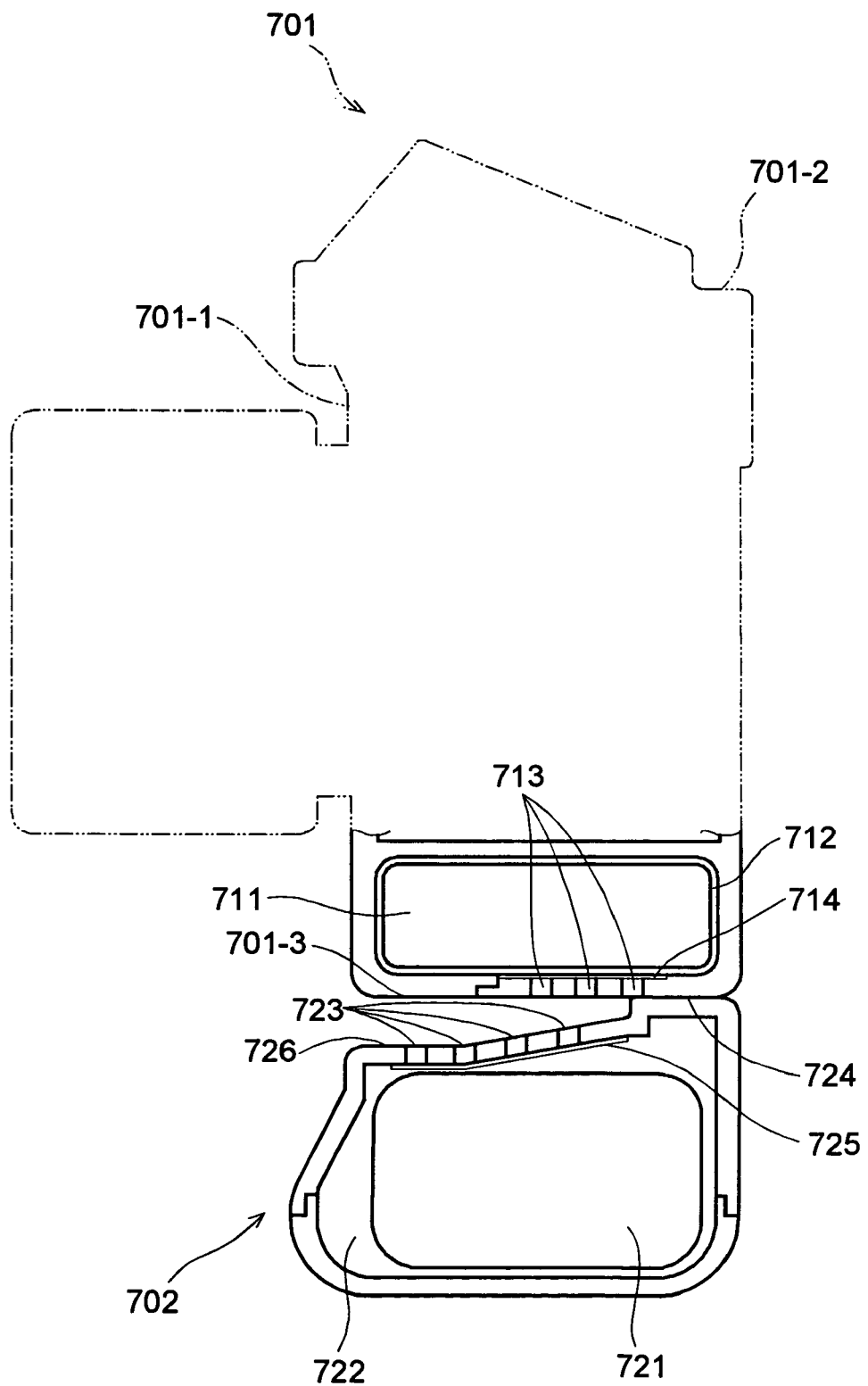
FIG. 19 is a vertical cross-sectional view of the central portion of the front surface of the casing of the camera which is another example employing the present invention, wherein an auxiliary unit is connected to the camera.

FIG. 19 represents a configuration in the vertical cross section of the front surface center of a camera as an electronic device employing the eighth embodiment of the present invention and a vertical position grip (auxiliary device of the camera).

The configuration (external appearance, inside the casing, electric configuration, and the like) of a camera 701 is basically identical, for example, to that of the camera 601 of the above-described seventh embodiment. Thus, FIG. 6 is a block diagram also representing an electric configuration of the camera 701.

However, both the air orifices 713 for linking the space inside the cell compartment 712 for accommodating the fuel cell 711 with the outside of the casing via a water repellent sheet 714 and the connection portion (not shown in the figure, but, in this example, it is a connection portion that can connect the positioning pin 324, tripod threaded portion 325, and hook 326 shown in FIG. 11, rather than the connection portion 614 shown in FIG. 17) are disposed at the bottom surface 701-3 of the casing (disposed at the same surface).

The vertical position grip 702, for example, has a configuration identical to that of the vertical position grip 302 (FIG. 12) of the above-described fourth embodiment.

Thus, in the vertical position grip 702, similarly to the vertical position grip 302 (FIG. 11 and FIG. 12), a release button (not shown in the figure, but is similar to the release button 322 (FIG. 11)) for a vertical position is provided at the front surface of the casing, and as shown in FIG. 19, a cell compartment 722 for accommodating a fuel cell 721 is provided inside the casing.

Further, in the vertical position grip 702, similarly to the vertical position grip 302 (FIG. 11 and FIG. 12), a connection portion (not shown in the figure, but is similar to the positioning pint 324, tripod threaded portion 325, and hook 326 (FIG. 11)) for connecting the camera 701 is provided at the connection surface 724 shown in FIG. 19, and air orifices 723 for linking the space inside the cell compartment 722 with the outside of the casing are provided at the surface 726 which is positioned below the connection surface 724 when this connection portion and the camera 701 are connected, as shown in FIG. 19. A water repellent sheet 725 is provided between the air orifices 723 and the inside of the casing.

As described hereinabove, in the camera 701 employing the eighth embodiment of the present invention, as shown in FIG. 19, there are provided, a first cell compartment 712 for accommodating a first fuel cell 711, first air orifices 713 for linking the space inside the first cell compartment 712 with the outside of the casing of the camera 701, and a connection portion (not shown in the figure, but in this example, the connection portion that can be connected to the positioning pin 324, tripod threaded portion 325, and hook 326 of the vertical position grip 302 (FIG. 11)) for connecting to the vertical position grip 702 comprising a second cell compartment 722 for accommodating a second fuel cell 721 and second air orifices 723 for linking the space inside the second cell compartment 722 with the outside of the casing of the vertical position grip 702, wherein the first air orifices 713 are in the position which is not in contact with the vertical position grip 702 when the vertical position grip 702 is connected to the aforementioned connection portion and in a position facing the second air orifices 723.

Furthermore, in the vertical position grip 702 employing the eighth embodiment of the present invention, as shown in FIG. 19, there are provided, the second cell compartment 722 for accommodating a second fuel cell 721, a connection portion (not shown in the figure, but similar to the positioning pin 324, tripod threaded portion 325, and hook 326 of the vertical position grip 302 (FIG. 11)) for connection to the camera 701 and disposed at the connection surface 724, and the second air orifices 723 for linking the space inside the second cell compartment 722 with the outside of the casing of the vertical position grip 702, those air orifices being disposed at the surface 726 located in the vicinity of the connection surface 724, of the surfaces of the casing of the vertical position grip 702, wherein the surface 726 where the second air orifices 723 are disposed faces the bottom surface 701-3 of the camera 701 and is not in contact therewith when the camera 701 is connected to the connection portion (connection surface 724).

In other words, as shown in FIG. 19, when the camera 701 is connected to the connection portion (the bottom surface 701-3 of the camera 701 is in contact with the connection surface 724 of the vertical position grip 702), the surface 726 of the vertical position grip 702 where the second air orifices 723 are disposed is at a certain distance from the bottom surface 701-3 of the camera 701.

As a result, even when the vertical position grip 702 is connected to the camera 701, the first air orifices 713 of the camera 701 and the second air orifices 723 of the vertical position grip 702 are not closed by the other device (the vertical position grip 702 for the first air orifices 713 and the camera 701 for the second air orifices 723), oxygen (air) can be reliably supplied to the first fuel cell 711 accommodated in the first cell compartment 712 of the camera 701 and to the second fuel cell 721 accommodated in the second cell compartment 722 of the vertical position grip 702, and the first fuel cell 711 and the second fuel cell 721 can continuously generate a sufficient quantity of electricity.

Further, the electronic device that can employ the present invention is not limited to the above-described camera and auxiliary devices therefor and may be any electronic device using a fuel cell as a power source. For example, the present invention can be used in cellular phones or portable information processing terminals such as PDA (Personal Digital Assistants).

As described hereinabove, the present invention makes it possible to use a fuel cell as a power source for an electronic device or a camera. In particular, it can provide for reliable supply of oxygen, which is necessary for the fuel cell to generate electric power, to the fuel cell.

What is claimed is:

1. An electronic device employing a fuel cell as a power source, comprising:
    a cell compartment for accommodating the fuel cell;
    an opening for linking a space inside the cell compartment with an outside of a casing of the electronic device to allow air to flow in and out of the space, which is disposed in a position in a vicinity of a center of a prescribed surface of the casing, the position being other than a portion which is held by a user, and
    an opening and shutting means having a lid that covers another opening of the cell compartment, the another opening being disposed on a different surface of the casing than the prescribed surface, wherein
    the electronic device is a camera comprising detachably or integrally a taking lens-barrel at a side of the prescribed surface of the casing where the opening is disposed; and
    the opening is disposed in a vicinity of the taking lens-barrel.

2. The electronic device according to claim 1, wherein a non-flat portion that is shaped differently from other parts of the casing is formed at the prescribed surface of the casing where the opening is disposed at a side opposite to that where the taking lens-barrel is disposed with respect to the opening, in the vicinity of the opening.

* * * * *

UNITED STATES PATENT AND TRADEMARK OFFICE
CERTIFICATE OF CORRECTION

| | | |
|---|---|---|
| PATENT NO. | : 7,653,301 B2 | Page 1 of 1 |
| APPLICATION NO. | : 10/866729 | |
| DATED | : January 26, 2010 | |
| INVENTOR(S) | : Akio Nishizawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1340 days.

Signed and Sealed this

Twenty-third Day of November, 2010

David J. Kappos
*Director of the United States Patent and Trademark Office*